(12) United States Patent
Takachi

(10) Patent No.: US 10,728,524 B2
(45) Date of Patent: Jul. 28, 2020

(54) IMAGING APPARATUS, IMAGING METHOD, IMAGE GENERATION APPARATUS, IMAGE GENERATION METHOD, AND PROGRAM

(71) Applicant: Sony Corporation, Tokyo (JP)

(72) Inventor: Taizo Takachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 14/310,220

(22) Filed: Jun. 20, 2014

(65) Prior Publication Data

US 2015/0002630 A1 Jan. 1, 2015

(30) Foreign Application Priority Data

Jun. 28, 2013 (JP) ................................. 2013-136218

(51) Int. Cl.
*H04N 13/236* (2018.01)

(52) U.S. Cl.
CPC ................................. *H04N 13/236* (2018.05)

(58) Field of Classification Search
CPC ................................................ H04N 13/0235
USPC .......................................................... 348/46
See application file for complete search history.

(56) References Cited

U.S. PATENT DOCUMENTS

| | | | | |
|---|---|---|---|---|
| 5,790,188 A | * | 8/1998 | Sun ....................... | G01J 3/2823 348/143 |
| 2004/0125228 A1 | * | 7/2004 | Dougherty .............. | G01S 11/12 348/345 |
| 2004/0165276 A1 | * | 8/2004 | Yahagi ................ | H04N 5/23212 359/629 |
| 2012/0038775 A1 | * | 2/2012 | Priesterjahn ............ | G07F 19/20 348/150 |
| 2012/0177285 A1 | * | 7/2012 | Tsurube ................. | G01C 3/085 382/154 |
| 2012/0257025 A1 | * | 10/2012 | Kim .................... | H04N 13/0497 348/51 |
| 2012/0314937 A1 | * | 12/2012 | Kim .................... | H04N 13/0033 382/154 |
| 2013/0169859 A1 | * | 7/2013 | Kawakami ........... | H04N 5/2256 348/369 |
| 2015/0206338 A1 | * | 7/2015 | Miura ..................... | G06F 3/013 345/419 |

FOREIGN PATENT DOCUMENTS

| | | |
|---|---|---|
| JP | 2004-233600 | 8/2004 |
| JP | 2012-103109 | 5/2012 |
| JP | 2012-191558 | 10/2012 |

* cited by examiner

*Primary Examiner* — Frederick D Bailey
*Assistant Examiner* — Amir Shahnami
(74) *Attorney, Agent, or Firm* — Michael Best & Friedrich LLP

(57) ABSTRACT

An imaging method and an imaging apparatus. In one embodiment, the imaging apparatus includes a lens unit, at least three image sensors, and a light-splitting unit. The lens unit focuses light. The at least three image sensors perform photoelectric conversion. The light-splitting unit splits the light from the lens unit into at least three light branches, and guides each one the at least three light branches to a corresponding one of the at least three image sensors.

23 Claims, 15 Drawing Sheets

IMAGING APPARATUS, IMAGING METHOD, IMAGE GENERATION APPARATUS, IMAGE GENERATION METHOD, AND PROGRAM

CROSS REFERENCE TO RELATED APPLICATIONS

This application claims the benefit of Japanese Priority Patent Application JP 2013-136218 filed Jun. 28, 2013, the entire contents of which are incorporated herein by reference.

BACKGROUND

The present disclosure relates to an imaging apparatus, an imaging method, an image generation apparatus, an image generation method, and a program and, more particularly, to an imaging apparatus, an imaging method, an image generation apparatus, an image generation method, and a program by which a 3D image can be easily obtained, for example.

Capturing a three-dimensional (3D) image can be performed by using, for example, various digital (video or still) camera such as a camera of a two-lens and two-sensor system, a camera of a two-lens and single-sensor system, a camera of a single-lens and single-sensor system, and a camera of a three-lens and three-sensor system.

The camera of the two-lens and two-sensor system includes two lens units that collect light as an imaging optical system as well as two image sensors (e.g., complementary metal oxide semiconductor (CMOS) sensor or charge coupled device (CCD)) as a photoelectric conversion unit that performs a photoelectric conversion.

The camera of the two-lens and single-sensor system includes two lens units and a single image sensor. The camera of the single-lens and single-sensor system includes a single lens unit and a single image sensor.

Further, the camera of the three-lens and three-sensor system includes three imaging units each formed of a single lens unit and a single image sensor. In other words, the camera of the three-lens and three-sensor system includes three lens units and three image sensors.

SUMMARY

Regarding the 3D image, it is desirable to propose a technique by which the 3D image can be more easily obtained.

In view of such circumstances, there is a need for providing an imaging apparatus, an imaging method, an image generation apparatus, an image generation method, and a program by which a 3D image can be easily obtained.

According to an embodiment of the present disclosure, there is provided an imaging apparatus comprising: a lens unit configured to focus light; at least three image sensors configured to perform photoelectric conversion; and a light-splitting unit configured to split the light from the lens unit into at least three light branches, each light branch corresponding to a different image sensor, and further configured to respectively guide the light branches to respective ones of the image sensors simultaneously.

According to another embodiment of the present disclosure, there is provided an imaging method, comprising: capturing, by an imaging apparatus, at least three images simultaneously in which focus is achieved for at least three different distances, the imaging apparatus including: a lens unit configured to focus light; at least three image sensors configured to perform photoelectric conversion; and a light-splitting unit configured to split the light from the lens unit into at least three light branches, each light branch corresponding to a different image sensor, and further configured to respectively guide the light branches to respective ones of the image sensors simultaneously.

Further, there is provided a non-transitory computer-readable medium having thereon instructions which form a program that causes a computer or processor to function as such an image generation apparatus or to perform such an imaging method.

Note that the imaging apparatus and the image generation apparatus may each be an independent apparatus or may be inside blocks constituting a single apparatus.

Further, the program may be provided by transmitting the program via a transmission medium or recording the program on a recording medium.

According to the embodiments of the present disclosure, it is possible to easily obtain a 3D image.

Note that the effects set forth herein are merely examples and the effects of the present disclosure are not limited to the effects set forth herein and additional effects may be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

<Capturing of 3D Image Using Existing Digital Camera>

Although embodiments of the present disclosure will be described hereinafter, a method of capturing (stereoscopically capturing) a 3D image using an existing digital camera will be described before that.

Figure 1:
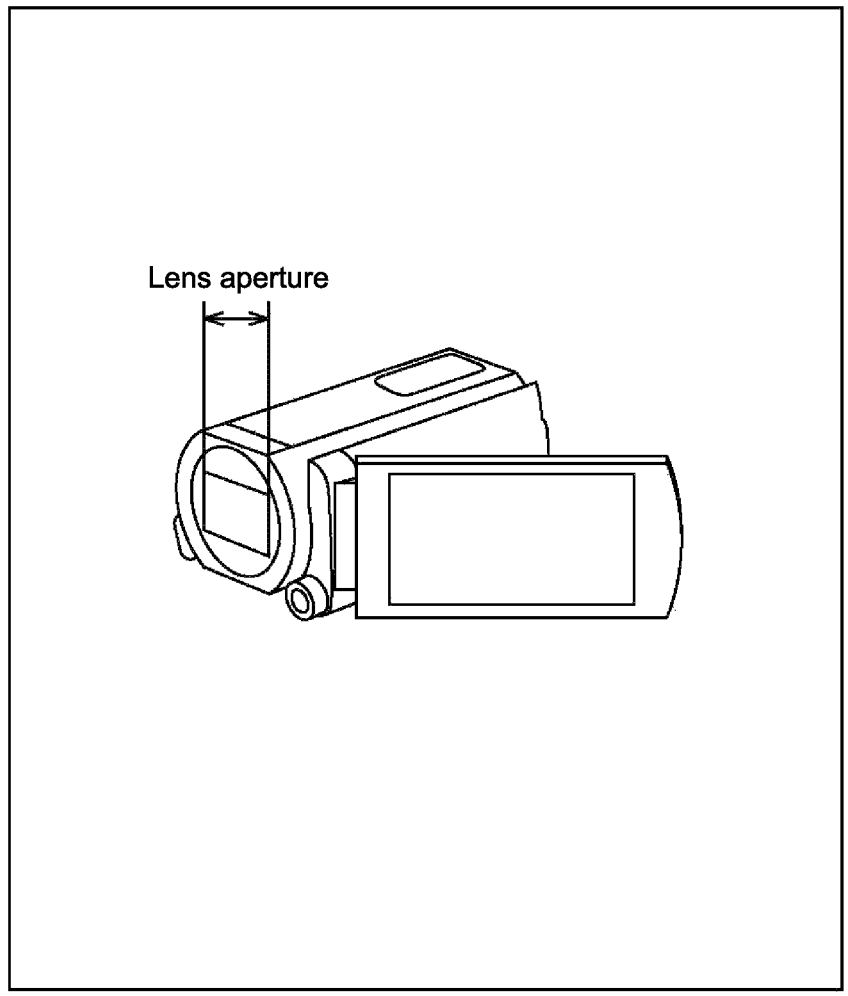
FIG. 1 is a perspective view showing a configuration example of a digital camera that captures a 2D image.

FIG. 1 is a perspective view showing a configuration example of a digital camera that captures a 2D image.

The digital camera that captures a 2D image (hereinafter, also referred to as 2D camera) is a camera of a single-lens and single-sensor system and includes a single lens unit and a single image sensor.

In the 2D camera, light collected by the lens unit is photoelectrically converted by the image sensor. By the photoelectric conversion, a 2D image is generated (captured).

Note that any digital camera including the 2D camera can capture a brighter image as a lens aperture of the lens unit becomes larger.

Figure 2:
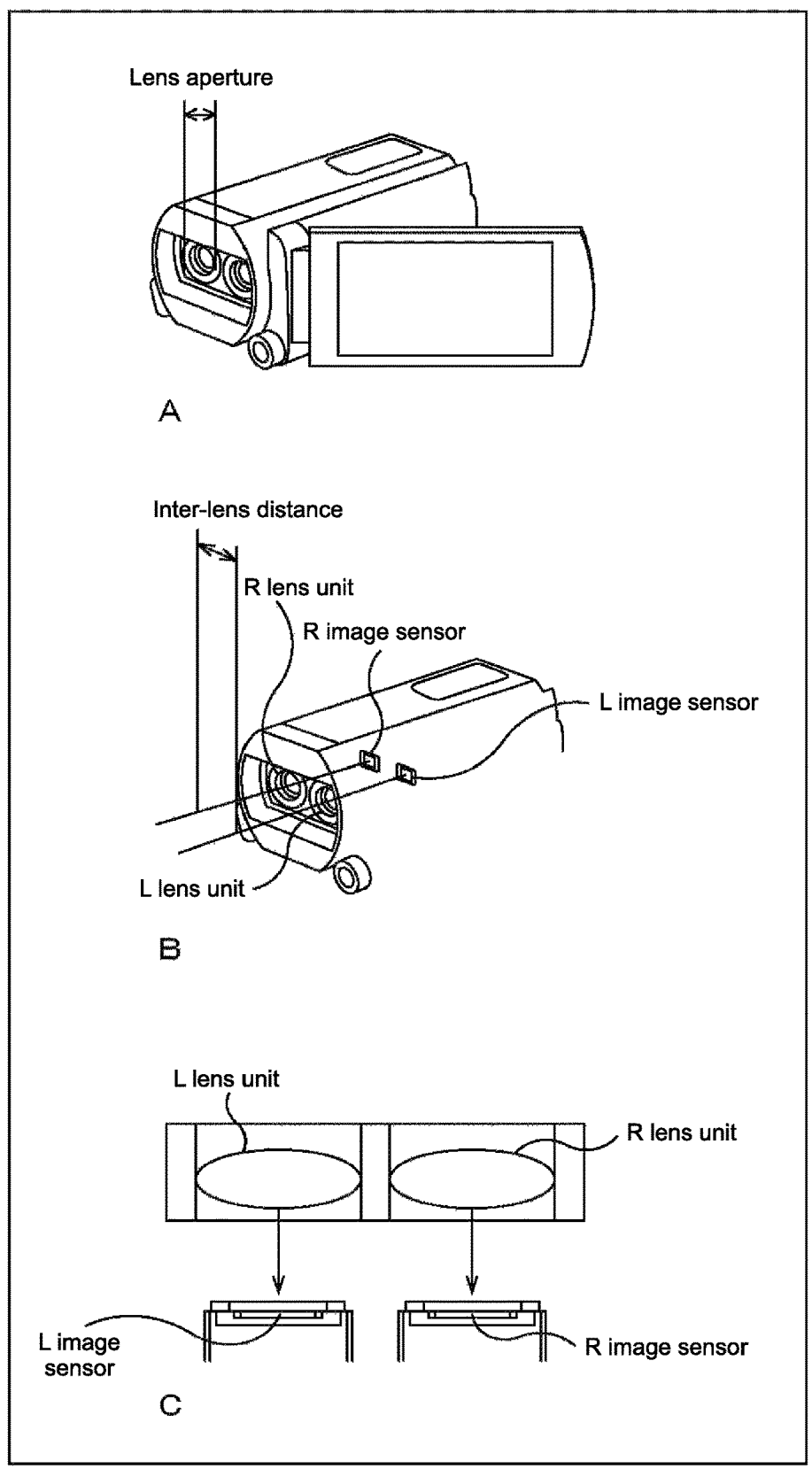
FIG. 2 is a view showing a configuration example of a camera of a two-lens and two-sensor system.

FIG. 2 is a view showing a configuration example of a camera (digital camera) of a two-lens and two-sensor system.

Specifically, Section A of FIG. 2 shows a perspective view showing a configuration example of an outer appearance of the camera of the two-lens and two-sensor system. Section B of FIG. 2 shows a perspective view showing the configuration example of the camera of the two-lens and two-sensor system whose interior can be seen through.

Further, Section C of FIG. 2 shows a plan view showing a configuration example of an imaging unit of the camera of the two-lens and two-sensor system, which captures an image.

The camera of the two-lens and two-sensor system includes two lens units and two image sensors. Those two lens units and two image sensors constitute the imaging unit.

The camera of the two-lens and two-sensor system can capture a 3D image in the following manner.

Specifically, in the camera of the two-lens and two-sensor system, light collected in a lens unit for a left eye (L-lens unit) of the two lens units is photoelectrically converted by an image sensor for the left eye (L-image sensor) of the two image sensors, such that a left (L) image for the left eye is generated.

In addition, in the camera of the two-lens and two-sensor system, light collected in a lens unit for a right eye (R-lens unit) of the two lens units is photoelectrically converted by an image sensor for the right eye (R-image sensor) of the two image sensors, such that a right (R) image for the right eye is generated.

The camera of the two-lens and two-sensor system performs capturing (generation) of the L-image and the R-image as the 3D image at the same time in this manner.

In the camera of the two-lens and two-sensor system, in order to generate the same parallax as human eyes, the two lens units are arranged such that an inter-lens distance (parallax separation) that is a distance between optical axes of the two lens units is almost equal to a distance between the left and right human eyes.

In the camera of the two-lens and two-sensor system, the inter-lens distance is limited to be almost equal to the distance between the human left and right eyes, and hence the lens aperture of the lens unit is also limited to a smaller aperture in comparison with the 2D camera of FIG. 1.

The lens unit having a smaller lens aperture is a lens having a larger F-value, in other words, a darker lens. Therefore, in the case where the lens unit includes a zoom lens that is such a darker lens, design constraints of the lens unit is more severe.

Also in the camera of the two-lens and two-sensor system, it is difficult to adjust and correct the positions of the left (L) lens unit and the right (R) lens unit.

In addition, the parallax caused by the eyes of a person is different between a macro position close to the person and an infinity position (position that can be considered as infinity) that is spaced apart from the person by several or several tens of meters or longer. Thus, the 3D image formed of the L-image and the R-image captured by the camera of the two-lens and two-sensor system can be, for example, an image in which the stereoscopic effect of a subject located at the macro position is too strong because the parallax is too large.

Specifically, for example, when the camera of the two-lens and two-sensor system captures an L-image and an R-image such that a certain parallax is caused in a subject located at a position spaced apart from the camera by a certain distance, the parallax of the subject located at the macro position in a 3D image obtained from such L- and R-images is larger than the parallax caused in the human eyes. Therefore, an image in which the stereoscopic effect of the subject located at the macro position is too strong can be obtained.

Thus, in the camera of the two-lens and two-sensor system, it can be difficult to adjust the parallax for causing a suitable parallax in any subject in the 3D image that is located at a different distance from the camera.

As a method of suitably correcting the parallax at positions different in distance, for example, the macro position and the infinity position, in the camera of the two-lens and two-sensor system of FIG. 2, there is a method of providing the camera of the two-lens and two-sensor system with an angle adjustment mechanism to be described later. However, if the camera of the two-lens and two-sensor system is provided with the angle adjustment mechanism, there is a fear that the structure of the optical system of the camera of the two-lens and two-sensor system becomes very complicated and the actual manufacture becomes difficult.

Figure 3:
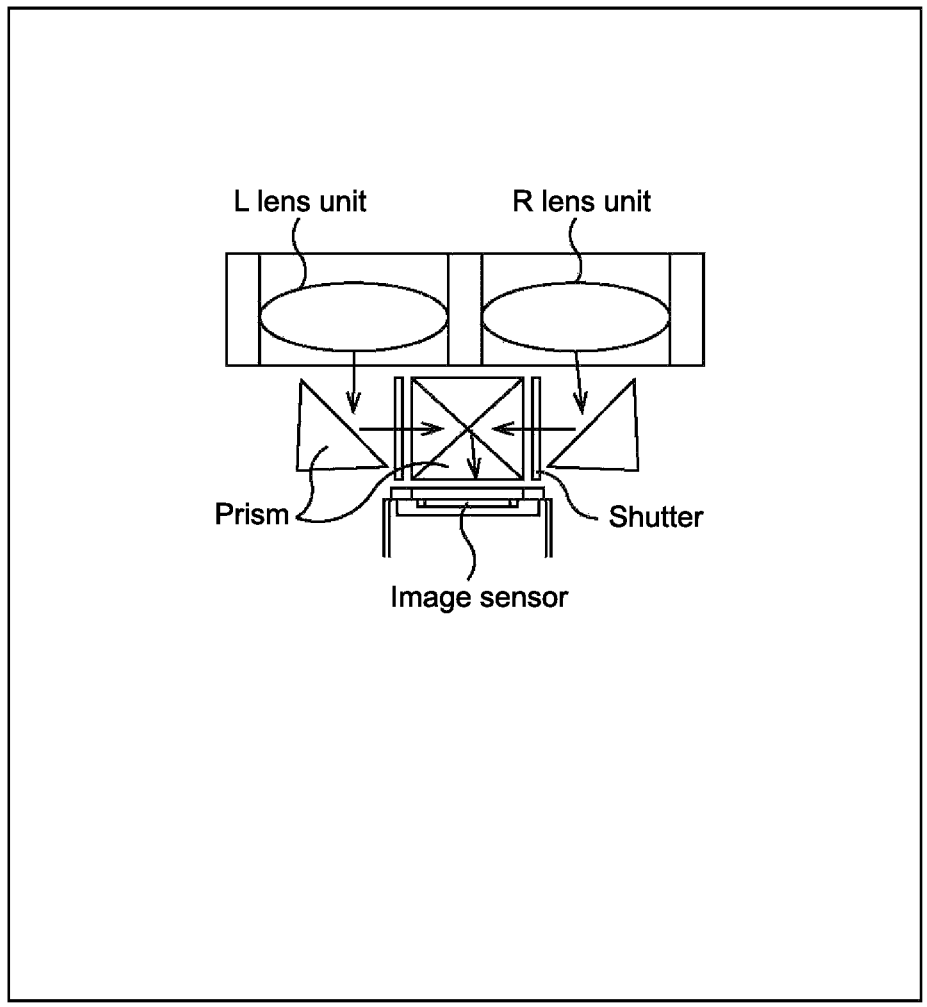
FIG. 3 is a plan view showing an imaging unit of a camera of a two-lens and single-sensor system, which captures an image.

FIG. 3 is a plan view showing a configuration example of an imaging unit of a camera (digital camera) of a two-lens and single-sensor system, which captures an image.

The camera of the two-lens and single-sensor system includes two lens units of the L-lens unit and the R-lens unit and a single image sensor.

In the camera of the two-lens and single-sensor system, light collected in the L-lens unit and light collected in the R-lens unit are alternately subjected to a photoelectrically conversion by the single image sensor by the use of a combination of prisms and shutters. As a result, the L-image and the R-image are generated.

The camera of the two-lens and single-sensor system includes the two lens units of the L-lens unit and the R-lens unit like the camera of the two-lens and two-sensor system. Therefore, like the camera of the two-lens and two-sensor system, the camera of the two-lens and single-sensor system has problems in that the design constraints of the lens unit may be more severe, it is difficult to adjust and correct the positions of the L-lens unit and the R-lens unit, the image in which the stereoscopic effect of the subject located at the macro position is too strong is obtained in the case of capturing the 3D image, and the like.

Note that, in order to correct the parallax, it can be necessary to incorporate the angle adjustment mechanism that adjusts the angle of light that enters the image sensors from the L-lens unit and the R-lens unit in the camera of the two-lens and single-sensor system.

Figure 4:
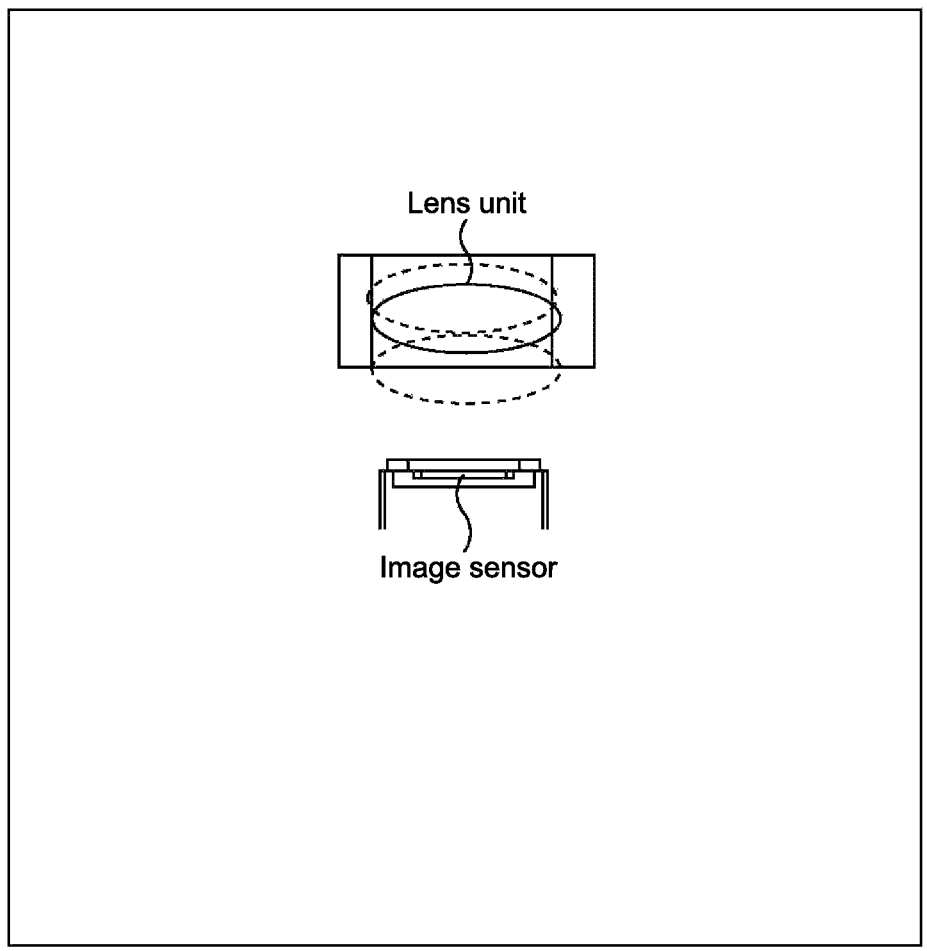
FIG. 4 is a plan view showing an imaging unit of a camera of a single-lens and single-sensor system, which captures an image.

FIG. 4 is a plan view showing a configuration example of an imaging unit of a camera (digital camera) of a single-lens and single-sensor system, which captures an image.

The camera of the single-lens and single-sensor system includes a single lens unit and a single image sensor.

The camera of the single-lens and single-sensor system can generate a 3D image by, for example, capturing a plurality of images of a single subject while changing an imaging position in a horizontal direction or the like and calculating a parallax with respect to the subject from the plurality of images.

Alternatively, the camera of the single-lens and single-sensor system can generate a 3D image by, for example, as shown in FIG. 4, capturing a plurality of images with a focal position that is an in-focus position being deviated while moving the single lens unit in an optical axis direction and calculating a parallax with respect to the subject from the plurality of images.

The camera of the single-lens and single-sensor system that captures the 3D image has a merit that this camera can be configured using the existing 2D camera.

However, in capturing the 3D image by the camera of the single-lens and single-sensor system, it is necessary to capture images while moving the imaging position or moving the lens unit in the optical axis direction. Thus, there is no problem if the subject does not move, but a temporal gap is caused among the images if the subject moves. As a result, for the moving subject, it can be difficult to generate a suitable 3D image.

Further, in the case where the camera of the single-lens and single-sensor system captures a necessary number of images while moving the single lens unit in the optical axis direction, light-exposure by the image sensor cannot be performed when the lens unit moves from a certain position to another position. An exposure period of time is shorten by at least a period of time when the lens unit is moving. As a result, the images obtained by the camera of the single-lens and single-sensor system are low in sensitivity (dynamic range).

Note that a camera of a three-lens and three-sensor system exists as a digital camera capable of correcting the parallax to be large at the macro position and small at the infinity position.

The camera of the three-lens and three-sensor system includes three lens units and three image sensors. In other words, the camera of the three-lens and three-sensor system includes three imaging units each formed of a single lens unit and a single image sensor.

The camera of the three-lens and three-sensor system corrects the parallax using images obtained from the three imaging units. Therefore, there is a fear that the correction processing is complicated and heavy-load processing. In addition, the camera of the three-lens and three-sensor system includes the three imaging units, and hence there is a fear that the camera of the three-lens and three-sensor system increases in size as a whole.

Three-dimensional display systems such as a 3D television (television receiver) that displays 3D images were commercialized several years ago. Many products are currently distributed at a relatively low price.

In comparison with those 3D display systems, products of 3D cameras each including a plurality of lens units (e.g., camera of two-lens and two-sensor system, camera of two-lens and single-sensor system, and camera of the three-lens and three-sensor system) out of the 3D cameras that capture 3D images are less popular than those of the 3D display systems. This is for the reasons as follows, for example.

Specifically, the size of the 3D camera including the plurality of lens units is larger than that of the 2D camera that captures a 2D image by the single lens unit by an amount of the plurality of lens units. Thus, the handling becomes difficult.

In addition, for the 3D camera of the two-lens and two-sensor system and the 3D camera of the two-lens and single-sensor system, it is necessary to prepare a lens unit that is totally different in structure from the lens unit of the 2D camera, and is, so to speak, dedicated to the 3D camera. Therefore, resources of the lens unit, the other optical components, and the like of the 2D camera cannot be utilized. Thus, the development costs, and therefore, the price of the products increase.

Further, the 3D camera including the plurality of lens units is capable of capturing the 2D image in addition to the 3D image. However, the 2D image captured by such a 3D camera has no merit in comparison with the 2D image captured by the 2D camera. This can be also considered as one of the reasons why the 3D cameras are not popular.

Note that the 3D camera of the two-lens and two-sensor system, the 3D camera of the two-lens and single-sensor system, or the like generates a 3D image in which subjects located at in-focus distances (focal distances) when the L-image and the R-image are captured are in focus. When such a 3D image is displayed in the existing 3D display system, the subject in focus when captured by the 3D camera is in an in-focus state but other subjects are in an out-of-focus state, that is, a blurred state.

For example, in the case where a subject spaced apart from the 3D camera by a certain distance is in focus and a subject located at a position closer to the 3D camera on a front side is not in focus, even when the user who views the 3D image by the 3D display system looks from the subject in focus to the subject on the front side, the subject on the front side is not in focus and remains blurred.

The subject looked by the user is not in focus and remains blurred, and hence the reality of the 3D image may be deteriorated.

In view of this, hereinafter, there is proposed a 3D camera that is inexpensive, small in size, and easily handled for easily obtaining a 3D image.

In addition, hereinafter, there is proposed a display system that displays a realistic 3D image.

<Embodiment of 3D Camera to which Present Disclosure is Applied>

Figure 5:
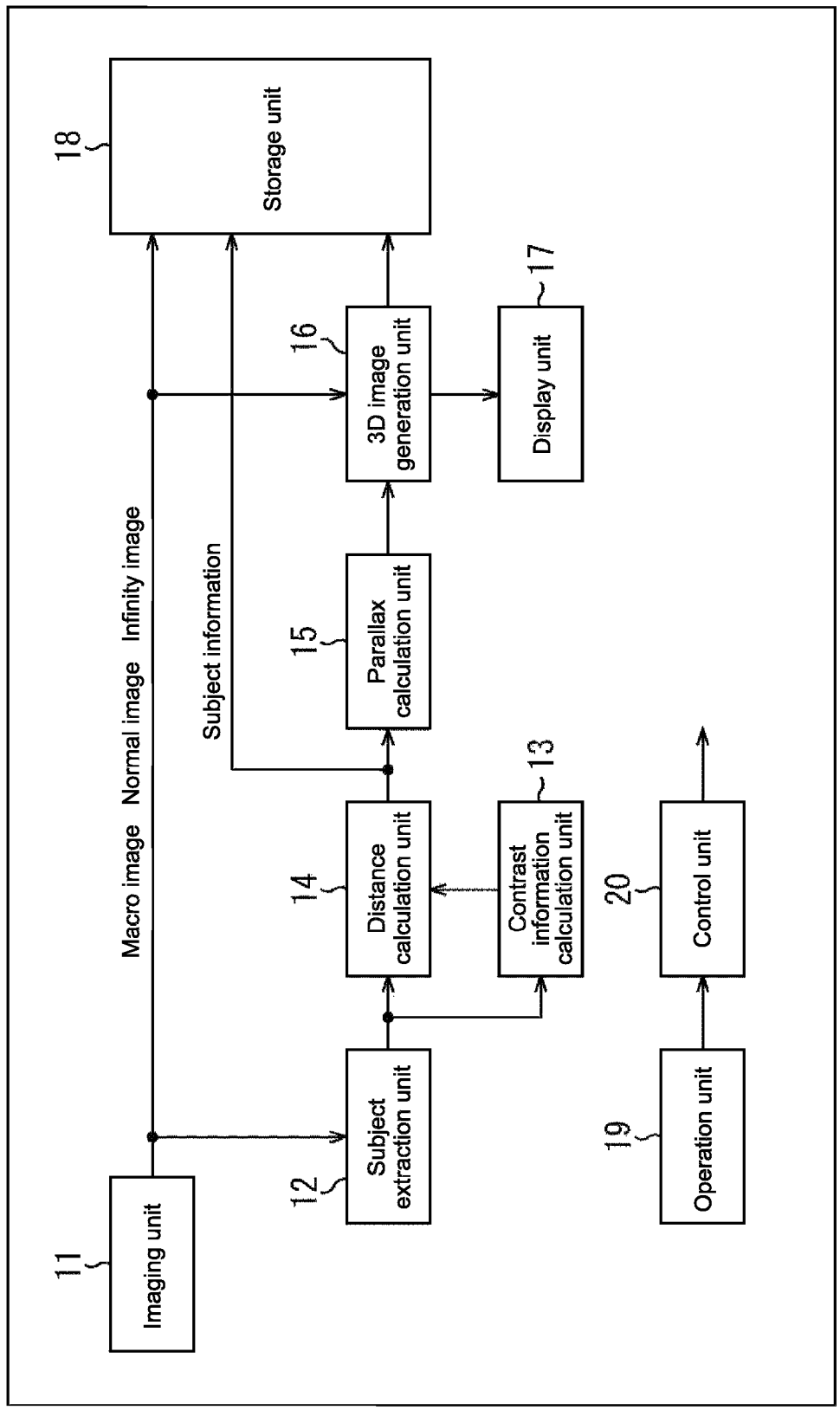
FIG. 5 is a block diagram showing a configuration example of an embodiment of a 3D camera to which the present disclosure is applied.

FIG. 5 is a block diagram showing a configuration example of an embodiment of a 3D camera to which the present disclosure is applied.

In FIG. 5, the 3D camera includes an imaging unit 11, a subject extraction unit 12, a contrast information calculation unit 13, a distance calculation unit 14, a parallax calculation unit 15, a 3D image generation unit 16, a display unit 17, a storage unit 18, an operation unit 19, and a control unit 20.

Now, assuming that a certain integer being three or more is represented by N, the 3D camera of FIG. 5 is a camera of a single-lens and N-sensor system and the imaging unit 11 includes, as will be described later, a single lens unit and three or more (N-number of) image sensors.

The imaging unit 11 captures, for example, an N-number of images, that is, for example, three images of a normal image, a macro image, and an infinity image at the same time at a predetermined frame rate in a manner to be described later. The imaging unit 11 provides those images to the subject extraction unit 12, the 3D image generation unit 16, and the storage unit 18.

The normal image means an image whose focal position that is an in-focus position is a normal position that is a position spaced apart from the imaging unit 11 by a predetermined distance. Further, the macro image is an image whose focal position is a macro position that is a position spaced apart from the imaging unit 11 by a smaller (shorter) distance than the predetermined distance. In addition, the infinity image means an image whose focal position is an infinity position that is a position that is a position spaced apart from the imaging unit 11 by a larger (longer) distance than the predetermined distance.

Provided that a distance from the imaging unit 11 to the focal position will be referred to as a focal distance, the imaging unit 11 captures distance-based images being three or more images with each of three or more distances being the focal distance.

For the sake of description, three images of the normal image, the macro image, and the infinity image as described above are employed as the three or more distance-based images.

Note that the imaging unit 11 may capture four or more distance-based images.

The subject extraction unit 12 extracts a subject from each of the normal image, the macro image, and the infinity image provided by the imaging unit 11. The subject extraction unit 12 provides those subjects to the contrast information calculation unit 13 and the distance calculation unit 14.

With each of the subjects extracted from the normal image, the macro image, and the infinity image that are provided by the subject extraction unit 12, the contrast information calculation unit 13 calculates contrast information indicating a contrast of the subject. The contrast information calculation unit 13 provides the contrast information to the distance calculation unit 14.

With respect to each of the subjects extracted from the normal image, the macro image, and the infinity image that are provided by the subject extraction unit 12, the distance calculation unit 14 calculates, based on the contrast information of each subject that is provided by the contrast information calculation unit 13, a subject distance being a distance from the imaging unit 11 to the subject. The distance calculation unit 14 provides the subject distances to the parallax calculation unit 15 and the storage unit 18 together with (the information on) the corresponding subjects as subject information.

With respect to each of the subjects included in the subject information that are provided by the distance calculation unit 14, the parallax calculation unit 15 calculates, based on the subject distance included in the subject information, a parallax (hereinafter, also referred to as subject parallax) depending on the subject distance. The parallax calculation unit 15 provides those parallaxes to the 3D image generation unit 16.

The 3D image generation unit 16 uses the normal image, the macro image, and the infinity image provided by the imaging unit 11, to generate, with respect to each subject, a 3D image having the subject parallax provided by the parallax calculation unit 15. The 3D image generation unit 16 provides those 3D images to the display unit 17 and the storage unit 18.

The display unit 17 includes a liquid-crystal panel or an organic electro-luminescence (EL) panel. The display unit 17 displays the 3D image provided by the 3D image generation unit 16. Note that the display unit 17 may display, in addition to this, for example, the normal image, the macro image, and the infinity image provided by the imaging unit 11 to the 3D image generation unit 16 and the 2D images generated from those images. The display unit 17 may further display, under the control of the control unit 20, a graphical user interface (GUI) or the like.

The storage unit 18 includes storage such as a hard disk and a semiconductor memory. The storage unit 18 stores the normal image, the macro image, the infinity image provided by the imaging unit 11, the subject information provided by the distance calculation unit 14, the 3D image provided by the 3D image generation unit 16, and the like in the storage depending on needs.

The operation unit 19 includes a physical button, a virtual button displayed on a touch screen (configured integrally with the display unit 17), and the like. The operation unit 19 is operated by the user. The operation unit 19 provides an operation signal according to an operation of the user to the control unit 20.

The control unit 20 controls the respective blocks constituting the 3D camera according to the operation signal or the like provided by the operation unit 19.

<Configuration Example of Imaging Unit 11>

Figure 6:
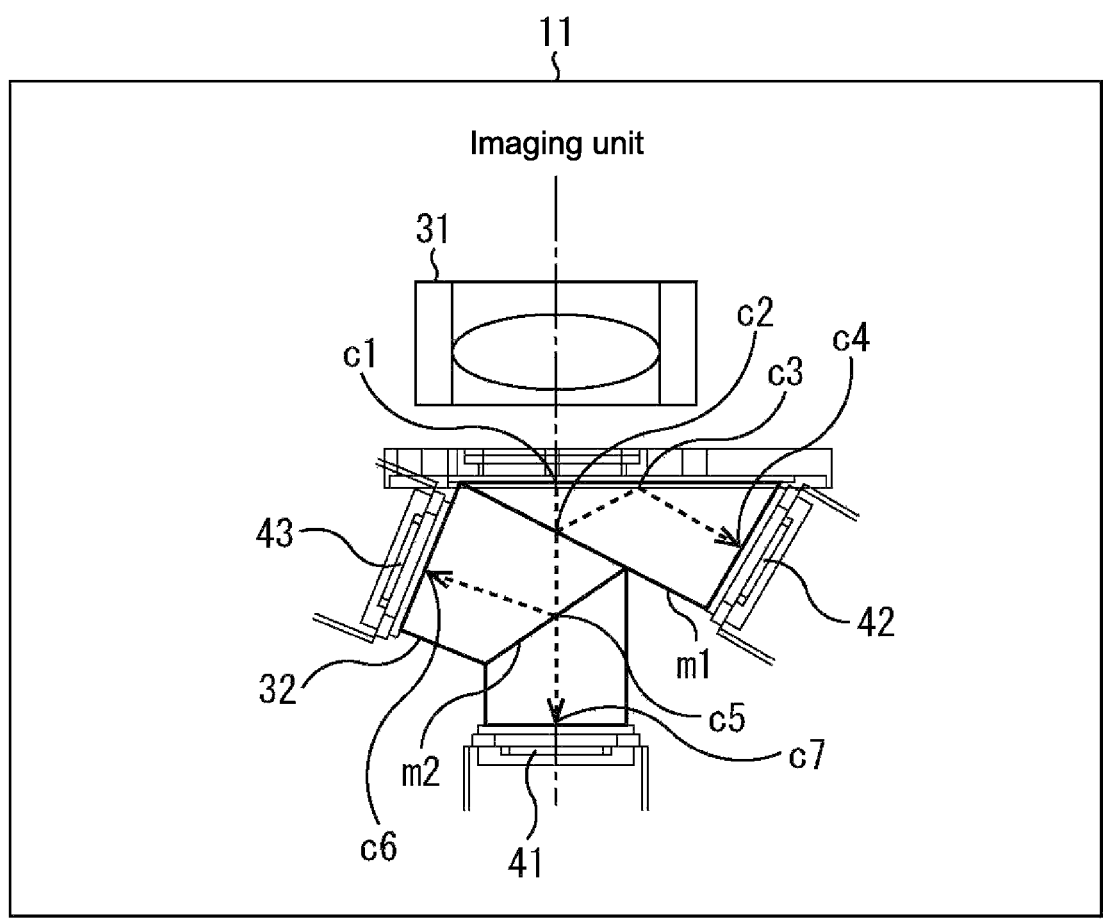
FIG. 6 is a plan view showing a configuration example of an imaging unit 11.

FIG. 6 is a plan view showing a configuration example of the imaging unit 11 of FIG. 5.

In FIG. 6, the imaging unit 11 includes a single lens unit 31, a light-dispersing unit 32, and three image sensors 41, 42, and 43 as three or more image sensors.

The lens unit 31 is an optical component for collecting light in the image sensors 41 to 43. The lens unit 31 includes a so-called focus lens, a zoom lens, a diaphragm, and the like depending on needs.

The light-dispersing unit 32 disperse lens-emitted light being light emitted by the lens unit 31 and makes the lens-emitted light incident upon each of the three image sensors 41 to 43.

In a camera of a so-called three-plate system, in order to receive each of light beams of R (red), G (green), and B (blue), light from a subject is dispersed into R-, G-, and B-light beams by the use of a prism.

Provided that the prism that disperses light into R-, G-, and B-light beams will be referred to as an RGB dispersion prism, a prism having the same structure as the RGB dispersion prism may be employed as the light-dispersing unit 32.

It should be noted that, in the RGB dispersion prism, a thin film such as a dielectric multi-layer film is formed in a mirror surface so as to reflect light having a particular wavelength and pass light having other wavelength therethrough, such that the light is dispersed into the R-, G-, and B-light beams. However, the light only needs to be dispersed irrespective of the wavelength in the light-dispersing unit 32, and hence a half mirror may be used for the prism serving as the light-dispersing unit 32 instead of the thin film such as the dielectric multi-layer film.

As described above, the light-dispersing unit 32 may be configured utilizing the RGB dispersion prism used in the three-plate camera.

In FIG. 6, a half mirror is formed in faces m1 and m2.

Lens-emitted light emitted by the lens unit 31 enters from a point c1 of the prism serving as the light-dispersing unit 32 and arrives at a point c2 on the half mirror of the face m1. Part of the light that has arrived at the point c2 (lens-emitted light) is reflected at the point c2 and arrives at a point c3. The point c3 is a mirror and the light that has arrived at the point c3 is entirely reflected at the point c3 and emitted from the point c4.

On a side of the prism serving as the light-dispersing unit 32, which is opposed to the point c4, an image sensor 42 is provided. Thus, the light (lens-emitted light) emitted from the point c4 enters the image sensor 42 and is photoelectrically converted.

The remaining light of the light (lens-emitted light) that has arrived at the point c2 passes through the point c2 and arrives at the point c5 on the half mirror of the face m2. Part of the light (lens-emitted light) that has arrived at the point c5 is reflected at the point c5 and is emitted from a point c6.

On a side of the prism serving as the light-dispersing unit 32, which is opposed to the point c6, an image sensor 43 is provided. Thus, the light (lens-emitted light) emitted from the point c6 enters the image sensor 43 and is photoelectrically converted.

Further, the remaining light of the light (lens-emitted light) that has arrived at the point c5 passes through the point c5 and is emitted from a point c7.

On a side of the prism serving as the light-dispersing unit 32, which is opposed to the point c7, an image sensor 41 is provided. Thus, the light (lens-emitted light) emitted from the point c7 enters the image sensor 41 and is photoelectrically converted.

In the image sensors 41 to 43, the incident light (lens-emitted light) from the light-dispersing unit 32 is photoelectrically converted in the above-mentioned manner, such that images are captured (at the same time).

Hereinafter, for example, with the point c1 of the prism serving as the light-dispersing unit 32 being a reference, an optical path length of light traveling from the point c1 to the image sensor 41 via the point c2, the point c5, and the point c7 will be referred to as a normal optical path length.

Similarly, with the point c1 being a reference, an optical path length of light traveling from the point c1 to the image sensor 42 via the point c2, the point c3, and the point c4 will be referred to as a macro optical path length.

Also similarly, with the point c1 being a reference, an optical path length of light traveling from the point c1 to the image sensor 43 via the point c2, the point c5, and the point c6 will be referred to as an infinity optical path length.

The normal optical path length (optical path length from the point c1 to the image sensor 41), the macro optical path length (optical path length from the point c1 to the image sensor 42), and the infinity optical path length (optical path length from the point c1 to the image sensor 43) are different.

Specifically, the normal optical path length is, for example, an optical path length adapted such that a normal position that is a position spaced apart from the lens unit 31 (in opposite to the light-dispersing unit 32) by a predetermined distance (e.g., several meters) as a reference distance defined in advance is the focal position that is the in-focus position.

Thus, the image sensor 41 upon which the light (lens-emitted light) passing through the optical path of the normal optical path length is incident captures an image in which a subject located at (near) the normal position is in focus.

Further, the macro optical path length is, for example, an optical path length adapted such that a macro position that is a position spaced apart from the lens unit 31 by a distance smaller than the predetermined distance, in other words, a position on a front side with respect to the normal position (on a front side as the lens unit 31 is viewed from the light-dispersing unit 32) is the focal position.

Thus, the image sensor 42 upon which the light passing through the optical path of the macro optical path length is incident captures an image in which a subject located at the macro position is in focus.

In addition, the infinity optical path length is, for example, an optical path length adapted such that an infinity position that is a position spaced apart from the lens unit 31 by a distance larger than the predetermined distance, in other words, a position on a rear side with respect to the normal position (on a rear side as the lens unit 31 is viewed from the light-dispersing unit 32) is the focal position.

Thus, the image sensor 43 upon which the light passing through the optical path of the infinity optical path length is incident captures an image in which a subject located at the infinity position is in focus.

The image in which the subject located at the normal position is in focus will be also referred to as a normal image. The image sensor 41 that captures the normal image will be also referred to as a normal-position sensor 41.

Similarly, the image in which the subject located at the macro position is in focus will be also referred to as a macro image. The image sensor 42 that captures the macro image will be also referred to as a macro-position sensor 42. Also similarly, the image in which the subject located at the infinity position is in focus will be also referred to as an infinity image. The image sensor 43 that captures the infinity image will be also referred to as an infinity-position sensor 43.

The normal-position sensor 41 is arranged such that the normal position is the focal position. The macro-position sensor 42 is arranged such that the macro position closer than the normal position is the focal position. The infinity-position sensor 43 is arranged such that the infinity position farther than the normal position is the focal position.

Therefore, assuming that the normal optical path length i.e. the optical path length of the normal-position sensor 41 (optical path length from the point c1 to the image sensor 41) is a reference, the macro optical path length i.e. the optical path length of the macro-position sensor 42 (optical path length from the point c1 to the image sensor 42) is longer than the normal optical path length.

On the other hand, the infinity optical path length i.e. the optical path length of the infinity-position sensor 43 (optical path length from the point c1 to the image sensor 43) is shorter than the normal optical path length.

Note that, in the 3D camera, focusing (e.g., automatic focusing) in capturing an image may be performed with the image captured by any one of the normal-position sensor 41, the macro-position sensor 42, and the infinity-position sensor 43, for example, the normal image captured by the normal-position sensor 41 being a target.

The light-dispersing unit 32 may disperse evenly and may also disperse unevenly the lens-emitted light emitted by the lens unit 31 to the normal-position sensor 41, the macro-position sensor 42, and the infinity-position sensor 43.

For example, in the case where the normal image is mainly used and the macro image and the infinity image are, so to speak, secondarily used for generating the 3D image in the 3D image generation unit 16 (FIG. 5), the light-dispersing unit 32 may disperse unevenly the lens-emitted light emitted by the lens unit 31 to the normal-position sensor 41, the macro-position sensor 42, and the infinity-position sensor 43.

In other words, for example, in the case where it is sufficient to calculate contrast information of subjects included in the macro image captured by the macro-position sensor 42 and the infinity image captured by the infinity-position sensor 43, for example, 1/8 light of the lens-emitted light emitted by the lens unit 31 may be dispersed to each of the macro-position sensor 42 and the infinity-position sensor 43 and the remaining 6/8 light may be dispersed to the normal-position sensor 41.

The above is the case where the normal-position sensor 41, the macro-position sensor 42, and the infinity-position sensor 43 captures (outputs) color images. If it is sufficient that the macro-position sensor 42 and the infinity-position sensor 43 can capture images for calculating the contrast information, the macro-position sensor 42 and the infinity-position sensor 43 may capture (output) black-and-white images instead of color images.

In the case where the macro-position sensor 42 and the infinity-position sensor 43 capture the black-and-white images, the sensitivity is almost twice in comparison with the case of capturing the color images.

Thus, provided that the 1/8 light of the lens-emitted light is necessary for calculating the contrast information in the case of capturing the color images as described above, only one-half of the light amount in the case of capturing the color images, i.e., for example, only one-half of 1/8 of the lens-emitted light, that is, only 1/16 light is necessary for calculating the contrast information because the sensitivity is twice in the case of capturing the black-and-white images.

In the case where the normal-position sensor 41 captures the color image and the macro-position sensor 42 and the infinity-position sensor 43 capture the black-and-white images as described above, it is possible to disperse 1/16 light of the lens-emitted light emitted by the lens unit 31 to each of the macro-position sensor 42 and the infinity-position sensor 43 and disperse the remaining 14/16 light to the normal-position sensor 41.

In this case, it is possible to disperse the lens-emitted light to the macro-position sensor 42 and the infinity-position sensor 43 while preventing the light amount of the lens-emitted light incident upon the normal-position sensor 41 that captures the normal image being the color image from being lowered.

As described above, the light-dispersing unit 32 unevenly disperses the lens-emitted light to the normal-position sensor 41, the macro-position sensor 42, and the infinity-position sensor 43, and specifically, the lens-emitted light is dispersed such that the light amount of the light incident upon the normal-position sensor 41 is larger than the light amount of the light incident upon the macro-position sensor 42 and the infinity-position sensor 43. Thus, the 3D camera shown in FIG. 1 can obtain an image having a high dynamic range.

For example, in the case of dispersing light having a large ratio such as 6/8 and 14/16 of the lens-emitted light to the normal-position sensor 41 and dispersing light having a small ratio such as 1/8 and 1/16 of the lens-emitted light to the macro-position sensor 42 and the infinity-position sensor 43, an image having a high dynamic range can be obtained by weighting-adding the output of the normal-position sensor 41, the output of the macro-position sensor 42, and the output of the infinity-position sensor 43 with appropriate weighting depending on the ratio of dispersion of the lens-emitted light.

<Example of Arrangement of Image Sensors 41 to 43>

Figure 7:
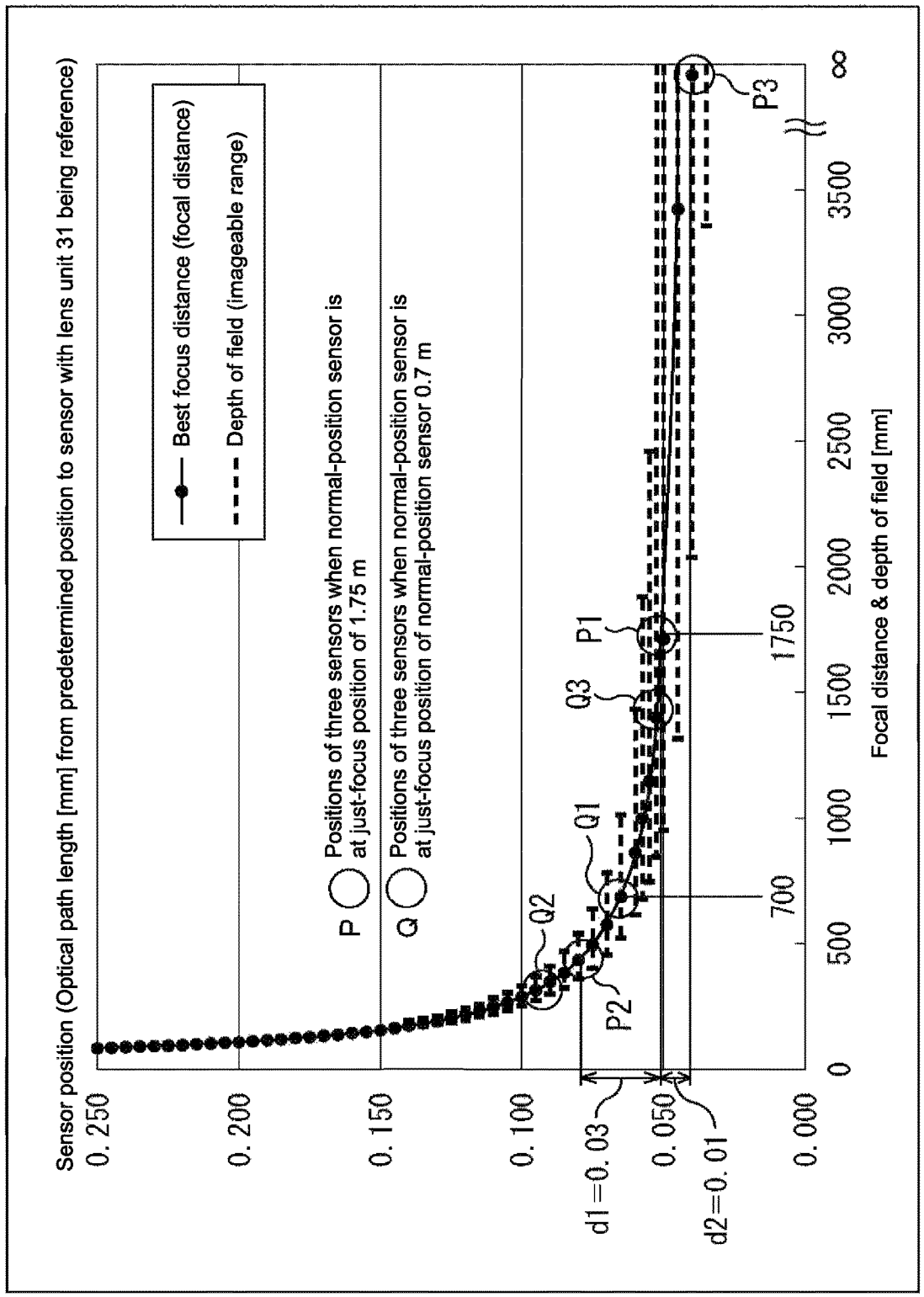
FIG. 7 is a view for explaining arrangement of a normal-position sensor 41, a macro-position sensor 42, and an infinity-position sensor 43.

FIG. 7 is a view for explaining an arrangement of the normal-position sensor 41, the macro-position sensor 42, and the infinity-position sensor 43 (image sensors 41 to 43) shown in FIG. 6.

As described above, the normal-position sensor 41 is arranged such that the normal position is the focal position. The macro-position sensor 42 is arranged such that the macro position closer than the normal position is the focal position. The infinity-position sensor 43 is arranged such that the infinity position farther than the normal position is the focal position.

Therefore, assuming that the optical path length of the normal-position sensor 41 (normal optical path length) being a reference, the optical path length of the macro-position sensor 42 (macro optical path length) is longer than the normal optical path length and the optical path length of the infinity-position sensor 43 (infinity optical path length) is shorter than the normal optical path length.

Optimal values of the positions (normal optical path length, macro optical path length, and infinity optical path length) of the normal-position sensor 41, the macro-position sensor 42, and the infinity-position sensor 43 shown in FIG. 6 can be, in principle, calculated in the following manner although the condition changes in some degree depending on the pixel size of the normal-position sensor 41, the macro-position sensor 42, and the infinity-position sensor 43, the F-value of the lens unit 31 (FIG. 6), and the like.

FIG. 7 shows a relationship between the position of the image sensor (hereinafter, also referred to as sensor position) and the focal distance.

Note that, in FIG. 7, a vertical axis indicates the sensor position and a horizontal axis indicates the focal distance.

The sensor position is represented by the (substantial) optical path length, for example, from the point c1 to the image sensor as a predetermined position with the lens unit 31 being a reference. Thus, as the value becomes smaller, the value indicates a position closer to the lens unit 31.

Further, the focal distance is a distance from the predetermined position with the lens unit 31 being a reference to the focal position (in-focus position). As a matter of course, as the value becomes smaller, the value indicates a position closer to the lens unit 31.

Further, in FIG. 7, a dotted line segment indicates a depth of field. As focus is achieved at a farther position (focal distance becomes larger), the depth of field becomes larger (deeper).

In FIG. 7, a point P1 indicates the sensor position i.e. the normal optical path length in the case where the focal distance of the normal-position sensor 41 is 1750 mm (1.75 m).

Further, a point P2 indicates the sensor position of the macro-position sensor 42 i.e. the macro optical path length in the case where the sensor position of the normal-position sensor 41 is indicated by the point P1. In addition, a point P3 indicates the sensor position of the infinity-position sensor 43 i.e. the infinity optical path length in the case where the sensor position of the normal-position sensor 41 is indicated by the point P1.

The sensor position (point) P2 of the macro-position sensor 42 is farther (from the lens unit 31) than the sensor position P1 of the normal-position sensor 41 by a distance d1=0.03 mm.

Further, the sensor position P3 of the infinity-position sensor 43 is closer (to the lens unit 31) than the sensor position P1 of the normal-position sensor 41 by a distance d2=0.01 mm.

Thus, the macro optical path length is longer than the normal optical path length by the distance d1=0.03 mm. The infinity optical path length is shorter than the normal optical path length by the distance 2=0.01 mm.

A relationship among the normal optical path length, the macro optical path length, and the infinity optical path length, in other words, an arrangement relationship among the normal-position sensor 41, the macro-position sensor 42, and the infinity-position sensor 43 is desirably set such that the ranges of the depth of field of the normal-position sensor 41, the macro-position sensor 42, and the infinity-position sensor 43 are in contact with one another as much as possible.

Specifically, the normal-position sensor 41 and the macro-position sensor 42 are desirably arranged such that a right edge of the range of the depth of field of the macro-position sensor 42 is in contact with a left edge of the range of the depth of field of the normal-position sensor 41 as much as possible. In other words, the normal-position sensor 41 and the macro-position sensor 42 are desirably arranged to be in contact with each other while slightly overlapping with each other or not to be largely spaced apart from each other.

Similarly, the normal-position sensor 41 and the infinity-position sensor 43 are desirably arranged such that a right edge of the range of the depth of field of the normal-position sensor 41 and a left edge of the range of the depth of field of the infinity-position sensor 43 are desirably in contact with each other as much as possible (arranged to be in contact with each other while slightly overlapping with each other or not to be largely spaced apart from each other).

As described above, the normal-position sensor 41, the macro-position sensor 42, and the infinity-position sensor 43 are arranged such that the ranges of the depth of field are in contact with one another as much as possible. Thus, regarding a subject having a large range from a close position to a far position to/from the 3D camera, any one of the normal-position sensor 41, the macro-position sensor 42, and the infinity-position sensor 43 can capture an image in focus.

As a method of arranging the normal-position sensor 41, the macro-position sensor 42, and the infinity-position sensor 43 such that the ranges of the depth of field are in contact with each other as much as possible, there is, for example, a method of setting the sensor position P2 of the macro-position sensor 42 to be a position slightly deviated on a left-hand side from the range of the depth of field of the normal-position sensor 41 provided at the sensor position P1 and setting the sensor position P2 of the infinity-position sensor 43 to be a position slightly deviated on a right-hand side from the range of the depth of field of the normal-position sensor 41 provided at the sensor position P1.

The normal-position sensor 41, the macro-position sensor 42, and the infinity-position sensor 43 are arranged such that the ranges of the depth of field are in contact with one other. Thus, the depth of field in the macro-position sensor 42 and the depth of field in the infinity-position sensor 43 do not at least overlap with each other.

Regarding each of the subjects from the macro position to the infinity position with the focal position of the normal-position sensor 41 (in-focus position in the normal image captured by the normal-position sensor 41) being a center, appropriate contrast information can be obtained for calculating a distance to the subject from the images captured by the normal-position sensor 41, the macro-position sensor 42, and the infinity-position sensor 43 (the normal image, the macro image, and the infinity image).

Specifically, regarding the respective subjects captured by the 3D camera, three contrast information items differ when focus is achieved and when focus is not achieved can be obtained from the images captured by the normal-position sensor 41, the macro-position sensor 42, and the infinity-position sensor 43.

Note that, as shown in FIG. 7, a relationship between the sensor position and the focal distance is not linear. When the focal distance is small (focusing is performed on a position close to the 3D camera), the sensor position sharply changes due to the change of the focal distance. When the focal distance is large (focusing is performed on a position far from the 3D camera), the sensor position smoothly changes due to the change of the focal distance.

As described above, regarding to the relationship between the sensor position and the focal distance, the sensor position sharply changes due to the change of the focal distance when the focal distance is small, and the sensor position smoothly changes due to the focal distance when the focal distance is large. Therefore, when the normal-position sensor 41, the macro-position sensor 42, and the infinity-position sensor 43 are arranged such that the ranges of the depth of field are in contact with one another, the distance d1 (=0.03 mm) from the sensor position P1 of the normal-position sensor 41 to the sensor position P2 of the macro-position sensor 42 having a small focal distance is longer than the distance d2 (=0.01 mm) from the sensor position P1 of the normal-position sensor 41 to the sensor position P3 of the infinity-position sensor 43 having a large focal distance.

By arranging the normal-position sensor 41 and the macro-position sensor 42 such that the distance d1 from the sensor position P1 of the normal-position sensor 41 to the sensor position P2 of the macro-position sensor 42 is large, the macro-position sensor 42 can capture an image (macro image) in which the subject located at the position closer to the 3D camera is in focus.

Further, the normal-position sensor 41, the macro-position sensor 42, and the infinity-position sensor 43 may be fixed to the light-dispersing unit 32 such that the arrangement relationship among them is not changed.

For example, in the case where the normal-position sensor 41 is fixed at the sensor position P1 having a focal distance of 1750 mm and the macro-position sensor 42 and the infinity-position sensor 43 are fixed at the sensor positions P2 and P3, respectively, for example, when the normal-position sensor 41 (substantially) moves to a sensor position Q1 having a focal distance of 700 mm by focus adjustment, the macro-position sensor 42 and the infinity-position sensor 43 move to sensor positions Q2 and Q3, respectively, a position relationship among the sensor positions Q1, Q2, and Q3 are identical to a position relationship among the sensor positions P1, P2, and P3.

<Calculation of Subject Distance>

Figure 8:
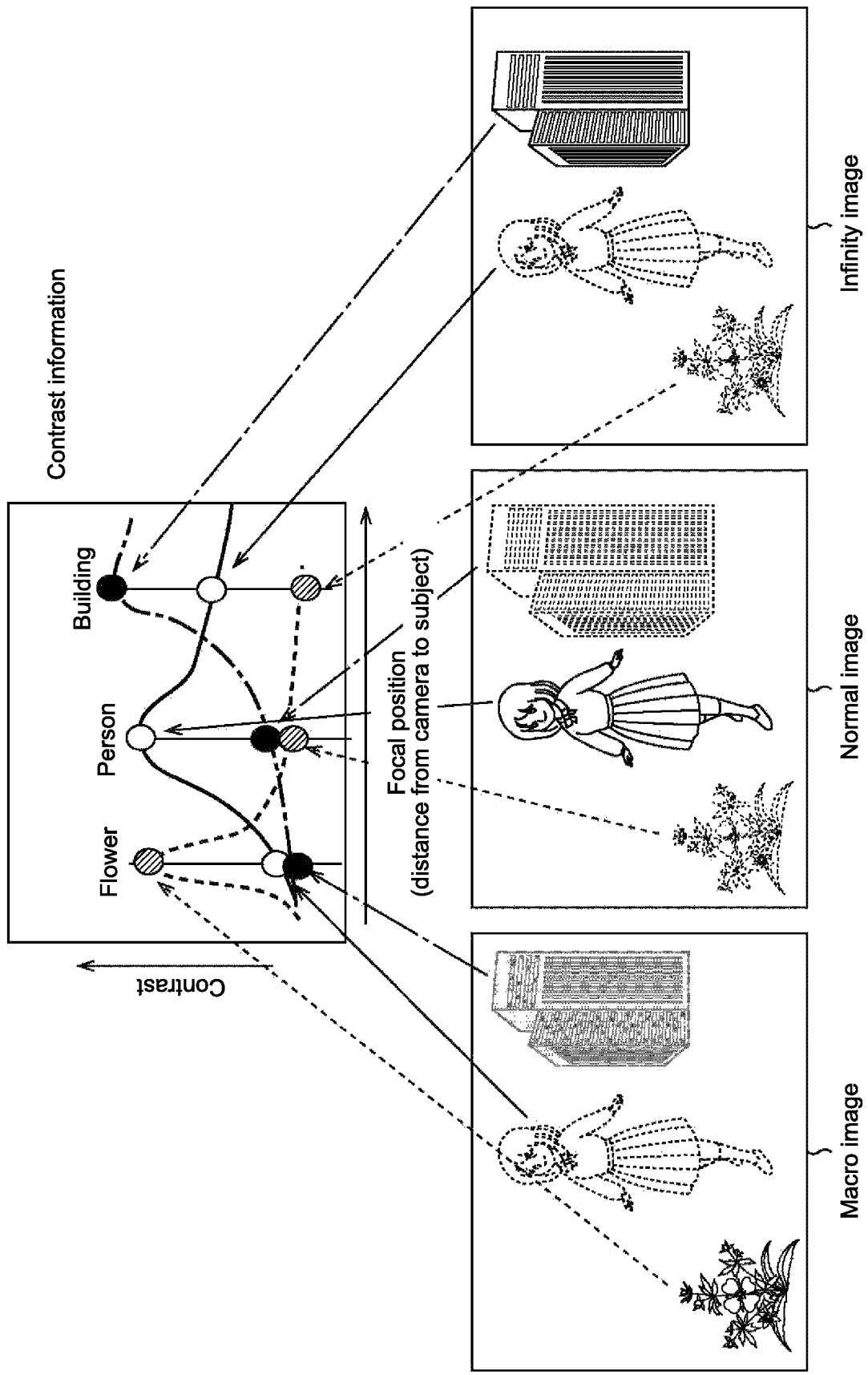
FIG. 8 is a view for explaining a method of calculating a subject distance in a distance calculation unit 14.

FIG. 8 is a view for explaining a method of calculating the subject distance by the distance calculation unit 14 shown in FIG. 5.

With respect to each of subjects extracted from each of the normal image captured by the normal-position sensor 41, the macro image captured by the macro-position sensor 42, and the infinity image captured by the infinity-position sensor 43, the distance calculation unit 14 calculates, based on the contrast information of the subject, a subject distance from the imaging unit 11 to the subject.

It is assumed that a flower is present at a position, for example, spaced apart from the 3D camera by about 500 mm as the macro position, a person is present at a position, for example, spaced apart from the 3D camera by about 1750 mm as the normal position, a building is present at a position, for example, spaced apart from the 3D camera by about 10 m as the infinity position, and the image captured by the 3D camera includes the flower, the person, and the building as the subjects.

In this case, in the normal image captured by the normal-position sensor 41, the person present at the normal position is in focus while the flower present at the macro position and the building present at the infinity position are not in focus and are blurred.

Further, in the macro image captured by the macro-position sensor 42, the flower present at the macro position is in focus while the person present at the normal position and the building present at the infinity position are not in focus and are blurred.

In addition, in the infinity image captured by the infinity-position sensor 43, the building present at the infinity position is in focus while the person present at the normal position and the flower present at the macro position are not in focus and are blurred.

In the 3D camera, the subject extraction unit 12 extracts, from each of the normal image, the macro image, and the infinity image as described above, the flower, the person, and the building as the subjects included in the normal image, the macro image, and the infinity image.

The contrast information calculation unit 13 calculates contrast information of each of the flower, the person, and the building as the subjects extracted from each of the normal image, the macro image, and the infinity image.

Specifically, the contrast information calculation unit 13 calculates, with respect to the person as the subject, three contrast information items using the normal image, the macro image, and the infinity image.

The person included in the normal image is in focus as described above. Therefore, regarding such a person, the contrast information determined using the normal image (hereinafter, also referred to as normal contrast information) has, for example, a large value indicating a high contrast.

However, the person included in the macro image is blurred as described above. Therefore, regarding such a person, the contrast information calculated using the macro image (hereinafter, also referred to as macro contrast information) has a small value indicating a low contrast.

The person included in the infinity image is also blurred. Therefore, regarding such a person, the contrast information calculated using the infinity image (hereinafter, also referred to as infinity contrast information) has a small value, obviously.

As described above, regarding the person, the three contrast information items of the normal contrast information having a large value, the macro contrast information having a small value, and the infinity contrast information can be calculated.

Further, regarding the normal image, the macro image, and the infinity image, the focal positions (focal distances) are uniquely defined by the arrangement positions (sensor positions) of the normal-position sensor 41, the macro-position sensor 42, and the infinity-position sensor 43. Therefore, the contrast information can be plotted in association with the focal position of the image used for calculating the contrast information.

In FIG. 8, the contrast information is plotted with a horizontal axis indicating the focal position and a vertical axis indicating the contrast information.

Regarding the person, the three contrast information items of the normal contrast information, the macro contrast information, and the infinity contrast information can be plotted.

The distance calculation unit 14 obtains, for example, from the control unit 20, information on the arrangement positions (sensor positions) of the normal-position sensor 41, the macro-position sensor 42, and the infinity-position sensor 43. The distance calculation unit 14 recognizes the focal positions of the normal image, the macro image, and the infinity image based on the information.

In addition, the distance calculation unit 14 approximates points (three points) obtained by plotting the three contrast information items about the person on the focal positions of the normal image, the macro image, and the infinity image, by a certain function. The distance calculation unit 14 calculates the focal position when the function (value) takes a peak, as the position of the person, that is, as the subject distance from the 3D camera to the person.

Also regarding each of the flower and the building as the other subjects, the distance calculation unit 14 calculates the subject distance in the same manner.

Note that the three images of the normal image, the macro image, and the infinity image are images different in the focal position. However, by using each of the three (or more) images different in the focal position to calculate the contrast information items of the same subject in this manner, it is possible to recognize which of the front side and the rear side of the focal position the subject is located on. In addition, focus adjustment (focusing) can be performed based on the result of the recognition.

<Calculation of Parallax>

Figure 9:
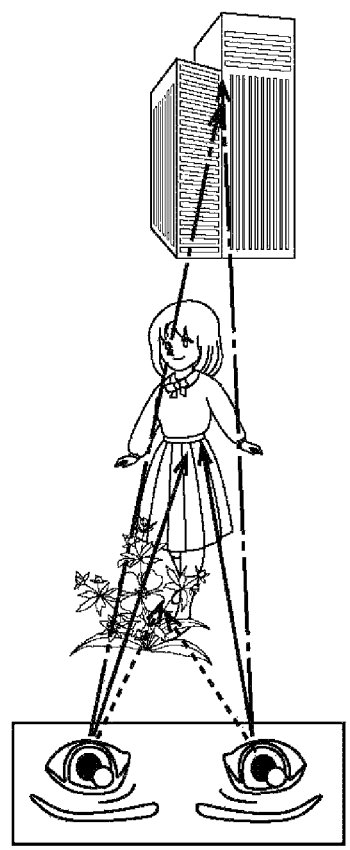
FIG. 9 is a view for explaining a method of calculating a parallax (subject parallax) in a parallax calculation unit 15.

FIG. 9 is a view for explaining a method of calculating a parallax (subject parallax) by the parallax calculation unit 15 shown in FIG. 5.

As shown in FIG. 9, with respect to the subject included in the subject information from the distance calculation unit 14, based on the subject distance included in the subject information, the parallax calculation unit 15 calculates a parallax depending on the subject distance (direction of line of sight, angle of convergence, or the like as viewing the subject from the position of the 3D camera) using a distance between the human left and right eyes and a trigonometric function. The parallax calculation unit 15 provides the parallax as the subject parallax to the 3D image generation unit 16.

<Generation of 3D Image>

Figure 10:
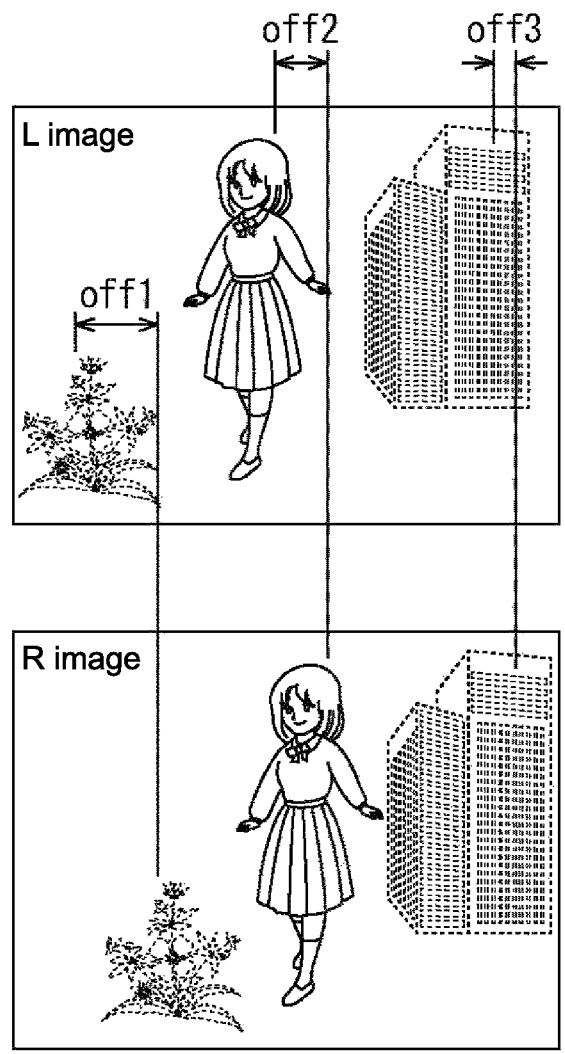
FIG. 10 is a view for explaining a method of generating a 3D image in a 3D image generation unit 16.

FIG. 10 is a view for explaining a method of generating a 3D image by the 3D image generation unit 16 shown in FIG. 5

With respect to each of the subjects included in the normal image, the macro image, and the infinity image provided by the imaging unit 11, the 3D image generation unit 16 calculates an offset amount in a horizontal direction for displaying it as the 3D image, using the subject parallax provided by the parallax calculation unit 15.

The 3D image generation unit 16 generates an L-image and an R-image as the 3D image in the following manner. Specifically, for example, the 3D image generation unit 16 sets the normal image out of the normal image, the macro image, and the infinity image provided by the imaging unit 11 as one of the L-image and the R-image serving as the 3D image. The 3D image generation unit 16 generates an image in which the subject included in the normal image is moved by the offset amount in the horizontal direction, and sets this image as the other of the L-image and the R-image.

The offset amount becomes larger as the parallax becomes larger, in other words, the subject becomes closer to the 3D camera.

Thus, for example, in the case where the flower, the person, and the building are present at the macro position, the normal position, and the infinity position and those flower, person, and building are included as the subjects in the normal image as now described with reference to FIG. 8, assuming that the offset amounts of the flower, the person, and the building are indicated by off1, off2, and off3, a relationship among the offset amounts off1 to off3 is expressed by the inequation of off1>off2>off3.

Here, the normal image is set as the one of the L-image and the R-image as it is and the image in which the subject included in the normal image is moved by the offset amount in the horizontal direction is set as the other of the L-image and the R-image. However, otherwise, for example, two images of an image in which the subject included in the normal image is deviated to one side in the horizontal direction and an image in which the subject is deviated to the other side, in which the position of the subject in the horizontal direction is different by the offset amount, may be set as the L-image and the R-image.

Further, in the case of generating the L-image and the R-image as the 3D image using the normal image out of the normal image, the macro image, and the infinity image each including the flower, the person, and the building respectively present at the macro position, the normal position, and the infinity position as the subjects as described above, the 3D image becomes an image in which the person at the normal position is in focus while the flower at the macro position and the building at the infinity position are in a blurred state.

The 3D image generation unit 16 may generate the 3D image using the macro image or the infinity image instead of the normal image, for example, according to an operation of the user.

In the case of generating the 3D image using the macro image, it is possible to obtain a 3D image in which the flower at the macro position is in focus while the person at the normal position and the building at the infinity position are in a blurred state. In the case of generating the 3D image using the infinity image, it is possible to obtain a 3D image in which the building at the infinity position is in focus while the flower at the macro position and the person at the normal position are in a blurred state.

Alternatively, for example, by generating a 3D image using the normal image for the person at the normal position, the macro image for the flower at the macro position, and the infinity image for the building at the infinity position, it is possible to obtain a 3D image in which all of the person at the normal position, the flower at the macro position, and the building at the infinity position are in focus.

Note that, in the case where the light-dispersing unit 32 unevenly disperses the lens-emitted light emitted by the lens unit 31 to the normal-position sensor 41, the macro-position sensor 42, and the infinity-position sensor 43 or in the case where the normal-position sensor 41 captures the color image and the macro-position sensor 42 and the infinity-position sensor 43 captures the black-and-white images as described with reference to FIG. 6, the 3D image generation unit 16 may generate the 3D image using the normal image captured by the normal-position sensor 41 whose light amount of the incident lens-emitted light is largest and that captures the color image.

Additionally, in this case, in generating the 3D image using the normal image, the 3D image generation unit 16 may use the macro image or the infinity image depending on needs.

In other words, for example, by generating a color component of the 3D image using the normal image and generating a luminance component of the 3D image using the macro image or the infinity image, it is possible to obtain a 3D image in which the flower at the macro position is in focus while the person at the normal position and the building at the infinity position are in a blurred state or a 3D image in which building at the infinity position is in focus while the flower at the macro position and the person at the normal position are in a blurred state.

Alternatively, for example, by replacing the luminance components of the flower and the building of the 3D image generated using the normal image by the luminance components generated using the macro image and the infinity image, it is possible to obtain a 3D image in which not only the person at the normal position but also the flower at the macro position and the building at the infinity position are in focus.

<Processing of 3D Camera>

Figure 11:
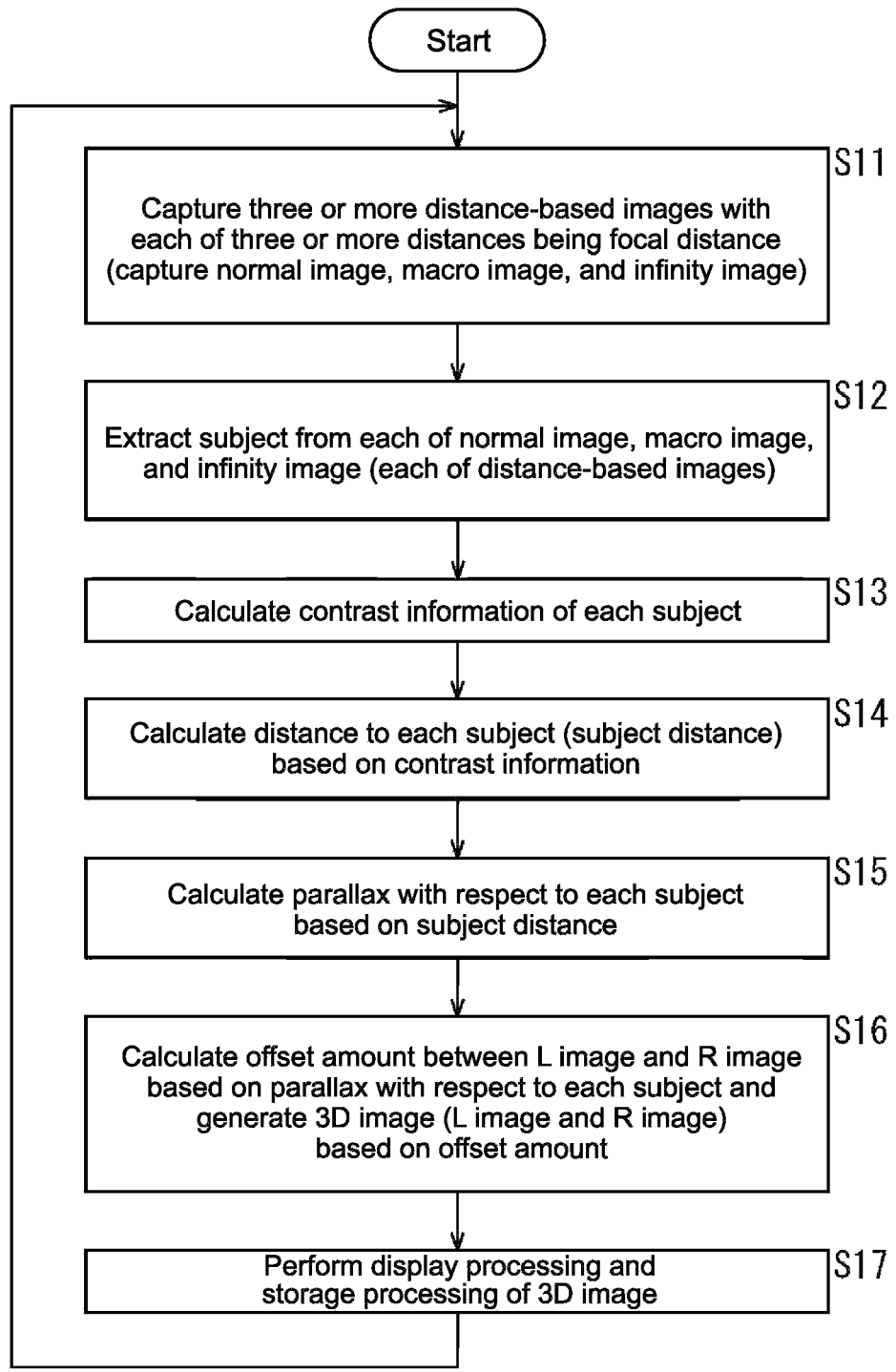
FIG. 11 is a flowchart for explaining processing of the 3D camera.

FIG. 11 is a flowchart for explaining processing of the 3D camera shown in FIG. 5.

In Step S11, the imaging unit 11 captures, as distance-based images that are three or more images with each of three or more distances being a focal distance, three images of a normal image, a macro image, and an infinity image with each of a normal position, a macro position, and an infinity position being a focal position, for example.

The imaging unit 11 provides the normal image, the macro image, and the infinity image to the subject extraction unit 12, the 3D image generation unit 16, and the storage unit 18. The processing proceeds from Step S11 to Step S12.

In Step S12, the subject extraction unit 12 extracts a subject from each of the normal image, the macro image, and the infinity image provided by the imaging unit 11. The subject extraction unit 12 provides those subjects to the contrast information calculation unit 13 and the distance calculation unit 14. The processing proceeds to Step S13.

In Step S13, with respect to each of the subjects extracted from each of the normal image, the macro image, and the infinity image provided by the subject extraction unit 12, the contrast information calculation unit 13 calculates contrast information indicating a contrast of the subject. The contrast information calculation unit 13 provides the contrast information to the distance calculation unit 14. The processing proceeds to Step S14.

In Step S14, with respect to each of the subjects extracted from each of the normal image, the macro image, and the infinity image provided by the subject extraction unit 12, the distance calculation unit 14 calculates, based on the contrast information provided by the contrast information calculation unit 13, a subject distance of the subject. The distance calculation unit 14 provides those subject distances to the parallax calculation unit 15 and the storage unit 18 together with (the information on) the subjects as the subject information. The processing proceeds to Step S15.

In Step S15, with respect to each of the subjects included in the subject information provided by the distance calculation unit 14, the parallax calculation unit 15 calculates, based on the subject distance included in the subject information, a parallax (subject parallax) depending on the subject distance. The parallax calculation unit 15 provides those parallaxes to the 3D image generation unit 16. The processing proceeds to Step S16.

In Step S16, the 3D image generation unit 16 calculates, based on the subject parallax of each subject that is provided by the parallax calculation unit 15, an offset amount that is a position difference in the horizontal direction between the L-image and the R-image that form the 3D image with respect to each of the subjects.

Also in Step S16, the 3D image generation unit 16 generates, based on the offset amount of each subject, an L-image and an R-image serving as the 3D image in which the position of the subject in the horizontal direction is deviated by the offset amount, using the normal image provided by the imaging unit 11 and further the necessary macro image and infinity image. The 3D image generation unit 16 provides the L-image and the R-image to the display unit 17 and the storage unit 18. The processing proceeds to Step S17.

In Step S17, the display unit 17 performs display processing of displaying the 3D image provided by the 3D image generation unit 16. By the display processing of the display unit 17, a so-called through-image is displayed.

Also in Step S17, the storage unit 18 performs storage processing of storing the normal image, the macro image, and the infinity image provided by the imaging unit 11, the subject information provided by the distance calculation unit 14, and the 3D image provided by the 3D image generation unit 16 depending on needs. By the storage processing of the storage unit 18, image recording is performed.

As described above, the imaging unit 11 includes only one lens unit 31, and hence it is possible to achieve downsizing and simplification of handling. Further, adjustment of the optical system such as position adjustment between the L-lens unit and the R-lens unit, which would be necessary in the two-lens and two-sensor system or the camera of the two-lens and single-sensor system, becomes unnecessary.

Further, in the imaging unit 11, the light-dispersing unit 32 that disperses the lens-emitted light can be configured utilizing the RGB dispersion prism used in the three-plate camera as described with respect to FIG. 6.

In addition, in the imaging unit 11, the lens unit 31 can be configured utilizing the lens unit used in the existing 2D camera.

Thus, for example, although the inter-lens distance is limited to almost the distance between the human left and right eyes in the camera of the two-lens and two-sensor system, there is not such a limitation of the camera of the two-lens and two-sensor system because the imaging unit 11 includes the single lens unit 31. A large variety including a zoom lens and the like having a large aperture diameter like the lens unit of the existing 2D camera can be adopted as the lens unit 31.

Thus, the resources of the lens unit, the other optical components, and the like of the existing 2D camera can be utilized in the optical system of the imaging unit 11. Therefore, the development costs for the optical components dedicated to the 3D camera become unnecessary and the 3D camera can be manufactured at low costs.

In addition, in the imaging unit 11, as described with reference to FIG. 6, the optical path length of the lens-emitted light incident upon the normal-position sensor 41, the macro-position sensor 42, and the infinity-position sensor 43 is different for each of the normal-position sensor 41, the macro-position sensor 42, and the infinity-position sensor 43. Specifically, for example, the optical path length of the lens-emitted light incident upon the normal-position sensor 41 is set such that the normal position is the focal position, the optical path length of the lens-emitted light incident upon the macro-position sensor 42 is set such that the macro position is the focal position, and the optical path length of the lens-emitted light incident upon the infinity-position sensor 43 is set such that (the position considered as) the infinity is the focal position. Therefore, the macro image, the normal image, and the infinity image in which focus is achieved at the macro position, the normal position, and the infinity position, respectively, can be captured at the same time.

Thus, with respect to not only the still subject but also the moving subject, the temporal gap, which would be caused in the plurality of images when captured by the camera of the single-lens and single-sensor system while changing the focal position, is not caused. In other words, the imaging unit 11 can capture the macro image, the normal image, and the infinity image having no temporal gap.

Further, when the normal-position sensor 41 captures the color image and the macro-position sensor 42 and the infinity-position sensor 43 capture the black-and-white images, it is possible to prevent the light amount of the lens-emitted light incident upon the normal-position sensor 41 that captures the normal image being the color image (and thus, the sensitivity of the normal-position sensor 41) from being lowered.

Note that the control unit 20 can control electronic shutters of the normal-position sensor 41, the macro-position sensor 42, and the infinity-position sensor 43 such that the electronic shutter of the normal-position sensor 41 and the electronic shutters of the macro-position sensor 42 and the infinity-position sensor 43 have different shutter speed. It is possible to an image having a high dynamic range by weighting-adding the output of the normal-position sensor 41, the output of the macro-position sensor 42, and the output of the infinity-position sensor 43 with appropriate weighting depending on the ratio of dispersion of the lens-emitted light and the shutter speed.

Further, the 3D camera can output, in addition to the 3D image, the 2D image (e.g., the normal image itself or the 2D image generated using the normal image, the macro image, and the infinity image), and it is possible to obtain an image having such a high dynamic range regarding both of the 3D image and the 2D image.

<Embodiment of Display System to which Present Disclosure is Applied>

Figure 12:
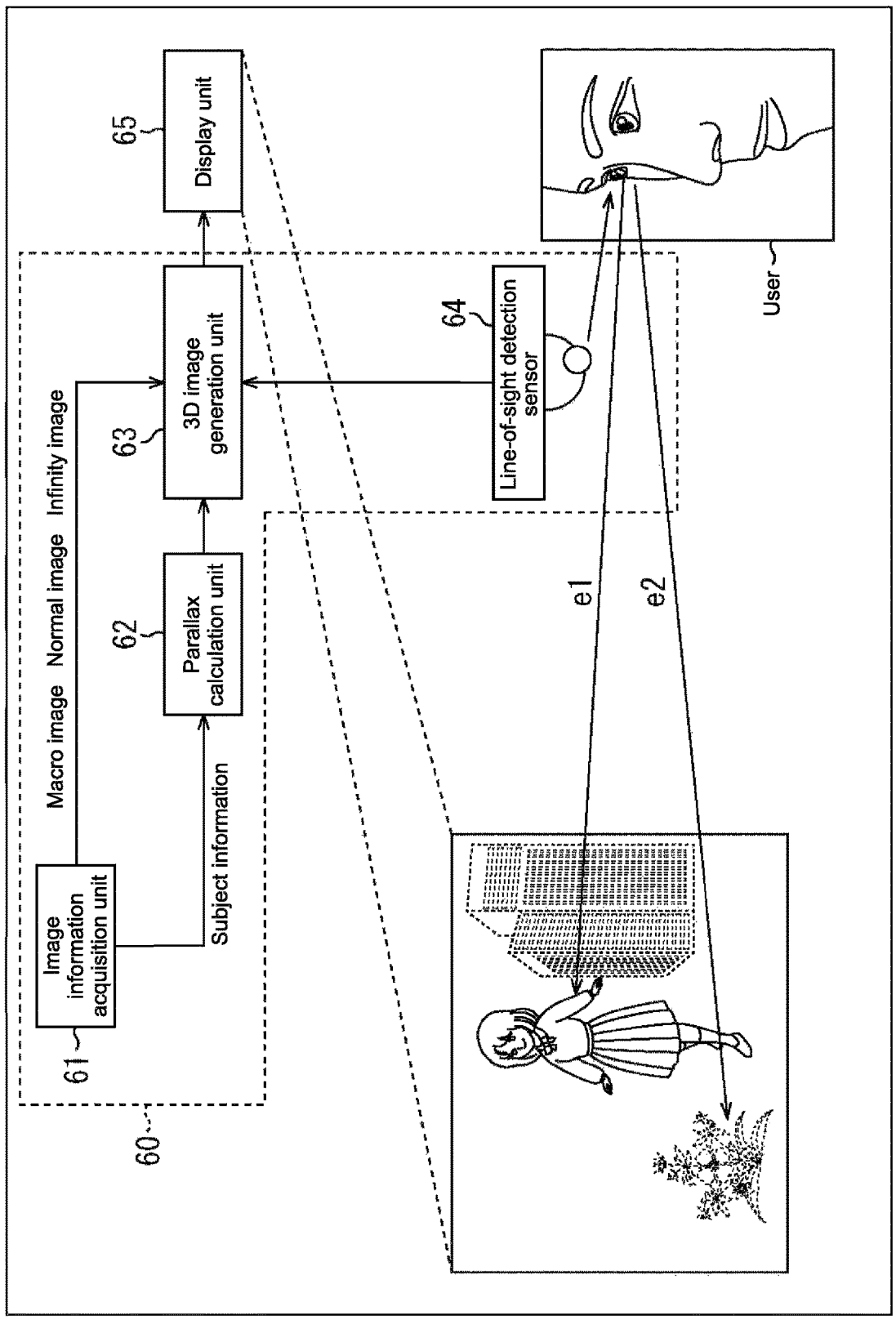
FIG. 12 is a block diagram showing a configuration example of an embodiment of a display system to which the present disclosure is applied.

FIG. 12 is a block diagram showing a configuration example of an embodiment of a display system to which the present disclosure is applied.

In FIG. 12, the display system includes an image generation unit 60 and a display unit 65.

The image generation unit 60 generates a 3D image depending on the line of sight of the user.

Thus, the image generation unit 60 includes an image information acquisition unit 61, a parallax calculation unit 62, a 3D image generation unit 63, and a line-of-sight detection sensor 64.

The image information acquisition unit 61 acquires, for example, from storage, a network, or other data providing means having a function of providing data, for example, a normal image, a macro image, and an infinity image obtained by the 3D camera shown in FIG. 5 as distance-based images that are three or more images with three or more distances each being a focal distance. Then, the image information acquisition unit 61 provides the normal image, the macro image, and the infinity image to the 3D image generation unit 63.

The image information acquisition unit 61 further acquires, from the data providing means, subject information of subjects included in the normal image, the macro image, and the infinity image, in other words, for example, subject information obtained by the distance calculation unit 14 shown in FIG. 5. Then, the image information acquisition unit 61 provides the subject information to the parallax calculation unit 62.

As in the parallax calculation unit 15 shown in FIG. 5, the parallax calculation unit 62 calculates a subject parallax based on the subject information provided by the image information acquisition unit 61. Then, the parallax calculation unit 62 provides the subject parallax to the 3D image generation unit 63 together with the subject information provided by the image information acquisition unit 61.

Based on the subject parallax provided by the parallax calculation unit 62, the 3D image generation unit 63 generates a 3D image using the normal image, the macro image, and the infinity image provided by the image information acquisition unit 61 as in the 3D image generation unit 16 shown in FIG. 5.

The 3D image generation unit 63 is provided with line-of-sight information indicating the line of sight of the user who views the 3D image displayed on the display unit 65 by the line-of-sight detection sensor 64.

Based on the line-of-sight information provided by the line-of-sight detection sensor 64, the 3D image generation unit 63 detects the subject (subject in a direction of the line of sight of the user) in which the user is interested (hereinafter, also referred to as subject of interest) among the subjects included in the 3D image displayed on the display unit 65.

Then, the 3D image generation unit 63 generates a 3D image in which the subject of interest is in focus, using the normal image, the macro image, and the infinity image as described with reference to FIG. 10.

The line-of-sight detection sensor 64 includes, for example, a camera. The line-of-sight detection sensor 64 detects the line of sight of the user, and provides the line-of-sight information indicating the line of sight to the 3D image generation unit 63.

The display unit 65 includes a liquid-crystal panel or an organic EL panel. The display unit 65 displays the 3D image provided by the 3D image generation unit 63.

Figure 13:
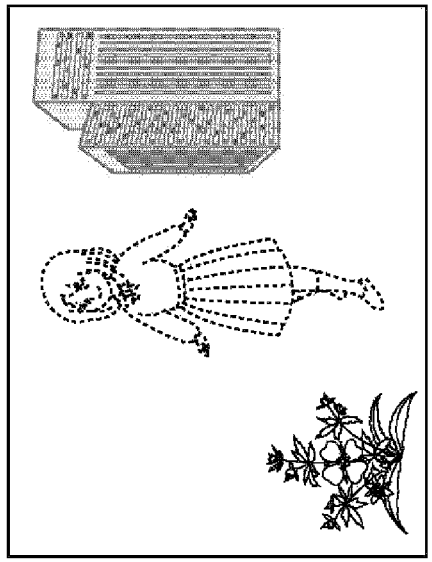
FIG. 13 is a view showing an example of a 3D image displayed in the display system.
Figure 13:
Figure 13:
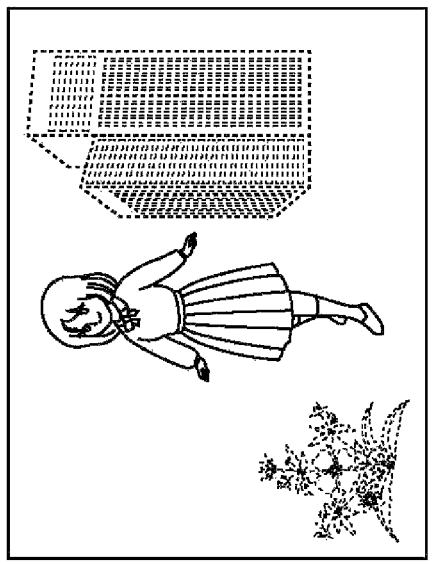

FIG. 13 is a view showing an example of a 3D image displayed in the display system shown in FIG. 12.

For example, the 3D image including the flower, the person, and the building that are present at the macro position, the normal position, and the infinity position as the subjects is displayed on the display unit 65. The line of sight of the user is oriented in a direction e1 (FIG. 12) of the person.

In this case, the 3D image generation unit 63 generates a 3D image in which, with the person in which the line of sight of the user is oriented being the subject of interest, the person as the subject of interest is in focus while the flower and the building at different distances from the person are in a blurred state.

After that, when the line of sight of the user is, for example, changed from the direction e1 of the person and a direction e2 (FIG. 12) of the flower, the 3D image generation unit 63 generates a 3D image in which, with the flower in which the line of sight of the user is oriented being the subject of interest, the flower as the subject of interest is in focus while the person and the building at different distances from the flower are in a blurred state.

As described above, the 3D image in which the subject in which the line of sight of the user, that is, the subject in which the user is interested is in focus is actively generated. Thus, it is possible to make the user feel more real.

Figure 14:
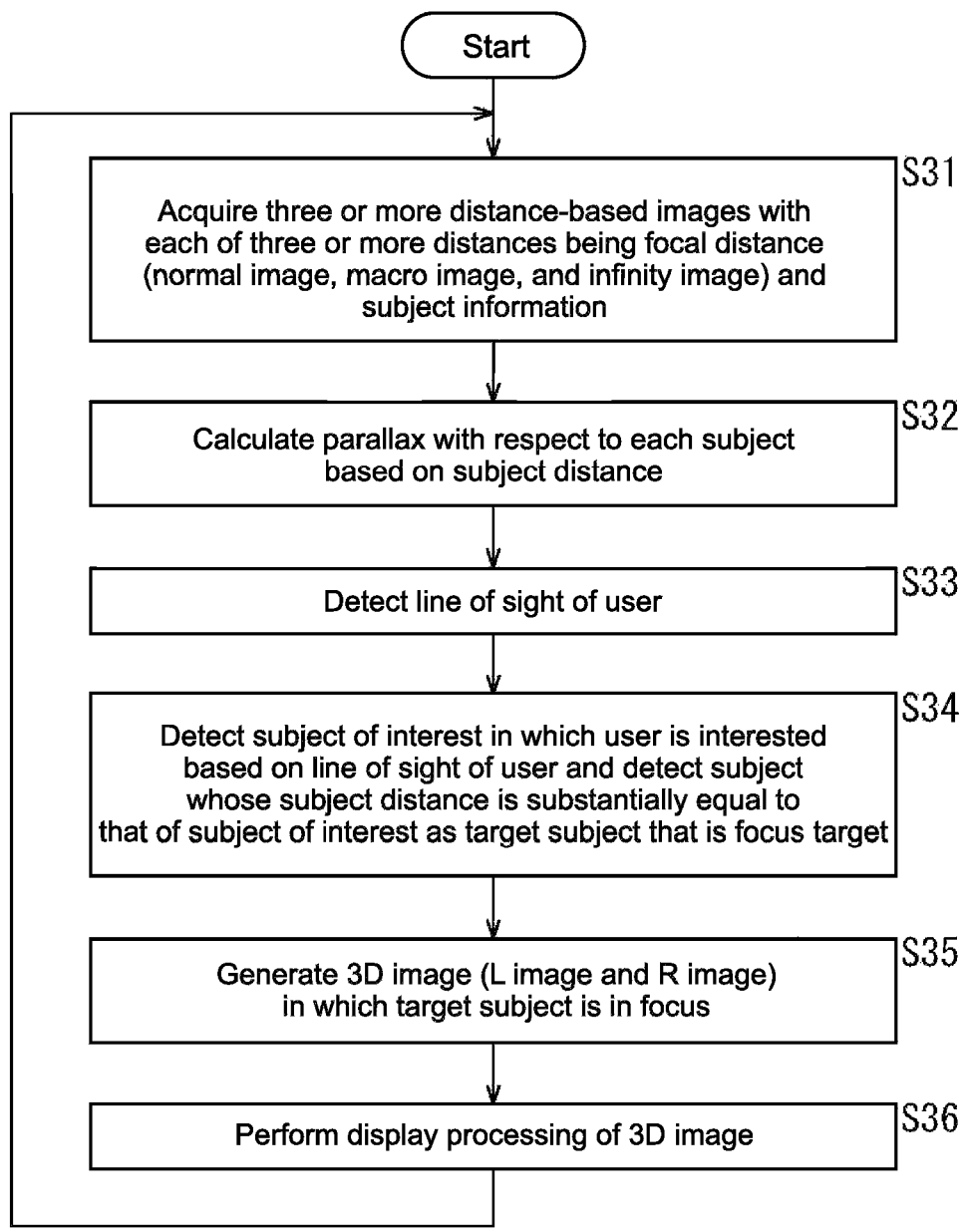
FIG. 14 is a flowchart for explaining processing of the display system.

FIG. 14 is a flowchart for explaining processing of the display system shown in FIG. 12.

In Step S31, the image information acquisition unit 61 acquires a normal image, a macro image, and an infinity image as distance-based images that are three or more images with each of three distances being a focal distance. Then, the image information acquisition unit 61 provides the normal image, the macro image, and the infinity image to the 3D image generation unit 63.

Also in Step S31, the image information acquisition unit 61 acquires subject information of subjects included in the normal image, the macro image, and the infinity image. The image information acquisition unit 61 provides the subject information to the parallax calculation unit 62. The processing proceeds to Step S32.

In Step S32, the parallax calculation unit 62 calculates a subject parallax based on the subject information provided by the image information acquisition unit 61. The parallax calculation unit 62 provides the subject parallax to the 3D image generation unit 63 together with the subject information provided by the image information acquisition unit 61. The processing proceeds to Step S33.

In Step S33, the line-of-sight detection sensor 64 detects the line of sight of the user and provides line-of-sight information indicating the line of sight to the 3D image generation unit 63. The processing proceeds to Step S34.

In Step S34, based on the line-of-sight information provided by the line-of-sight detection sensor 64, the 3D image generation unit 63 detects the subject of interest in which the user is interested among the subjects included in the image displayed on the display unit 65.

In addition, based on the subject information provided by the parallax calculation unit 62, the 3D image generation unit 63 detects, among the subjects included in the image displayed on the display unit 65, the subject whose subject distance is substantially equal to that of the subject of interest (e.g., subject whose difference in the subject distance from the subject of interest is within a predetermined threshold) as a target subject that is a focus target to be in focus. The processing proceeds from Step S34 to Step S35.

Here, the target subject includes the subject of interest.

In Step S35, based on the subject parallax provided by the parallax calculation unit 62, the 3D image generation unit 63 generates a 3D image in which the target subject is in focus while the subjects other than the target subject, in other words, the subjects whose subject distance is largely different from that of the subject of interest are in a blurred state, using the normal image, the macro image, and the infinity image provided by the image information acquisition unit 61.

The 3D image generation unit 63 generates a 3D image using the normal image, the macro image, and the infinity image. Therefore, the 3D image generation unit 63 can generate an image in which the subject located at (near) the normal position is in focus (and the subjects at the macro position and the infinity position other than the normal position are in a blurred state), an image in which the subject located at (near) the macro position is in focus (and the subjects at the normal position and the infinity position other than the macro position are in a blurred state), or an image in which the subject located at (near) the infinity position is in focus (and the subjects at the normal position and the macro position other than the infinity position are in a blurred state).

As described above, the 3D image generation unit 63 generates a 3D image and provides the 3D image to the display unit 65. The processing proceeds from Step S35 to Step S36.

In Step S36, the display unit 65 performs display processing of displaying the 3D image provided by the 3D image generation unit 63. With this, on the display unit 65, displayed is a 3D image in which the subject of interest in which the user is interested and on the subject located at a distance (position) substantially equal to that of the subject of interest are in focus.

As described above, in the display system shown in FIG. 12, the line of sight of the user is detected. The subject of interest in which the user is interested among the subjects included in the 3D image displayed on the display unit 65 is detected based on the line of sight of the user. The 3D image in which the subject of interest is in focus is generated using for example, the normal image, the macro image, and the infinity image as the distance-based images that are the three or more images with three or more distances being the focal distances. Therefore, it is possible to provide the 3D image that changes in synchronization of the line of sight of the user, in other words, the 3D image having a realistic stereoscopic effect (with reality) in which the subject in focus changes in real time depending on the movement of the line of sight of the user.

Note that, regarding the image sensors 41 to 43 that constitute the imaging unit 11, like the three-plate camera, an image sensor that captures an R-component image can be adopted as the image sensor 41, the image sensor that captures a G-component image can be adopted as the image sensor 42, and an image sensor that captures a B-component image can be adopted as the image sensor 43.

In this case, the R-component image becomes an image in which the subject located at the normal position is in focus, the G-component image becomes an image in which the subject located at the macro position is in focus, and the B-component image becomes an image in which the subject located at the infinity position is in focus. Each of the 3D image generation units 16 and 63 can generate a 3D image from such R-, G-, and B-component images.

In the case where the image sensor that captures the R-component image is adopted as the image sensor 41, the image sensor that captures the G-component image is adopted as the image sensor 42, and the image sensor that captures the B-component image is adopted as the image sensor 43, in the light-dispersing unit 32 shown in FIG. 6, a thin film that reflects a G-light beam and passes light having other wavelength therethrough is formed on the face m1 and a thin film that reflects a B-light beam and passes light having other wavelength therethrough is formed on the face m2.

Further, the 3D camera shown in FIG. 5 can be utilized for measuring a distance to the subject in addition to capturing an image.

<Explanation of Computer to which Present Disclosure is Applied>

The sequence of processes as described above (or at least part of the sequence of processes) may be performed by hardware or may be performed by software. In the case where the sequence of processes is performed by the software, the program configuring the software is installed into a general-purpose computer or the like.

Figure 15:
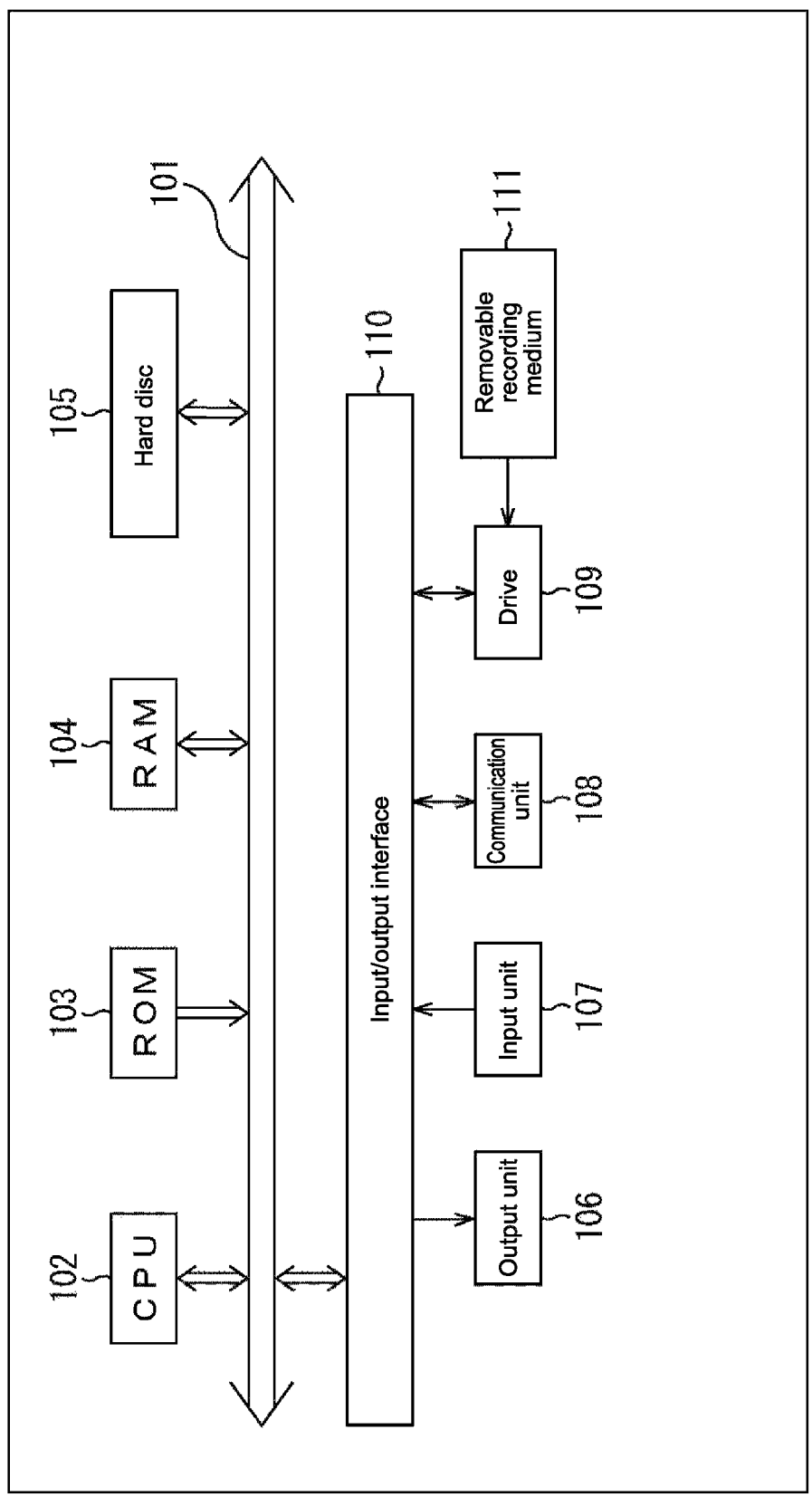
FIG. 15 is a block diagram showing a configuration example of an embodiment of a computer to which the present disclosure is applied.

FIG. 15 shows a configuration example of an embodiment of a computer in which the program for executing the above-mentioned sequence of processes is installed.

The program may be stored in advance in a hard disk 105 or an ROM 103 as recording media incorporated in the computer.

Alternatively, the program may be stored (recorded) in a removable recording medium 1117. Such a removable recording medium 1117 may be provided as so-called package software. Examples of the removable recording medium 1117 include a flexible disc, a compact disc read only memory (CD-ROM), a magneto optical (MO) disc, a digital versatile disc (DVD), and a magnetic disc, a semiconductor memory.

Note that the program may be, in addition to being installed into the computer from the removable recording medium 1117 as described above, downloaded into the computer via a communication network or a broadcast network and installed into the built-in hard disk 105. In other words, the program may be wirelessly transferred to the computer, for example, from a download site via a satellite for digital terrestrial broadcasting or may be transferred to the computer via a network such as a LAN (local area network) and the Internet through a wire.

The computer includes a built-in central processing unit (CPU) 102. An input/output interface 110 is connected to the CPU 102 via the bus 101.

When an instruction is input by, for example, the user operating the input unit 107 via the input/output interface 110, the CPU 102 executes the program stored in a read only memory (ROM) 103 according to the input. Alternatively, the CPU 102 loads the program stored in the hard disk 105 into a random access memory (RAM) 104 and executes the program.

With this, the CPU 102 performs processing according to the above-mentioned flowchart or processing to be performed by the components of the block diagram described above. Then, depending on needs, for example, the CPU 102 outputs the processing result from an output unit 106, transmits the processing result from a communication unit 108, or records the processing result on the hard disk 105 via, for example, the input/output interface 110.

Note that the input unit 107 includes a keyboard, a mouse, a microphone, and the like. Further, the output unit 106 includes a liquid crystal display (LCD), a speaker, and the like.

Herein, the processing steps performed by the computer according to the program do not necessarily needs to be chronologically performed following the order described as the flowchart. In other words, the processing steps performed by the computer according to the program include also processing steps to be performed in parallel or individually (e.g., parallel processing or object processing).

Further, the program may be processed by a single computer (processor) or may be subjected to distributed processing by a plurality of computers. In addition, the program may be transferred to a remote computer and executed.

In addition, herein, the system means the assembly of components (apparatuses, modules (parts) or the like). All the components may be provided in a single casing or do not need to be provided in the single casing. Thus, both of a plurality of apparatuses that are provided in separate casings and connected via a network and a single apparatus including a plurality of modules housed in a single casing serve as the system.

Note that the embodiments of the present disclosure are not limited to the above-mentioned embodiments and may be variously modified without departing from the gist of the present disclosure.

For example, the present disclosure may take a cloud computing configuration in which a single function is shared with a plurality of apparatuses via a network and commonly processed.

Further, the above-mentioned steps in the flowchart may be performed by a single apparatus or may be shared with and performed by a plurality of apparatuses.

In addition, if a single step includes a plurality of processes, the plurality of processes included in the single step may be, in addition to be performed by a single apparatus, shared with and performed by a plurality of apparatuses.

Note that the present disclosure may also take the following configurations.

(1) An imaging apparatus, comprising: a lens unit configured to focus light; at least three image sensors configured to perform photoelectric conversion; and a light-splitting unit configured to split the light from the lens unit into at least three light branches, each light branch corresponding to a different image sensor, and further configured to respectively guide the light branches to respective ones of the image sensors simultaneously.

(2) The imaging apparatus according to (1), wherein each light branch has a different optical path length.

(3) The imaging apparatus according to (2), wherein the at least three image sensors include: a normal-position sensor positioned such that an optical path length of a normal-position light branch is a predetermined distance corresponding to a focal position of the lens unit; a macro-position sensor positioned such that an optical path length of a macro-position light branch is less than the predetermined distance; and an infinity-position sensor positioned such that an optical path length of an infinity-position light branch is greater than the predetermined distance.

(4) The imaging apparatus according to (3), wherein the normal-position sensor is configured to output a color image; and the macro-position sensor and the infinity-position sensor are configured to respectively output a black-and-white image.

(5) The imaging apparatus according to (3) wherein the light-splitting unit is configured to split the light from the lens unit such that a light amount of the normal-position light branch is larger than respective light amounts of the macro-position light branch and the infinity-position light branch.

(6) The imaging apparatus according to (5), wherein the light amount of the normal-position light branch is at least six times larger than respective light amounts of the macro-position light branch and the infinity-position light branch.

(7) The imaging apparatus according to (3), further comprising: an electronic normal-position shutter corresponding to the normal-position sensor; an electronic macro-position shutter corresponding to the macro-position sensor; an electronic infinity-position shutter corresponding to the infinity-position sensor; and a control unit configured to control the normal-position, macro-position, and infinity-position shutters such that a shutter speed of the normal-position shutter is different from respective shutter speeds of the macro-position and infinity-position shutters.

(8) The imaging apparatus according to (3), further comprising: a subject extraction unit configured to extract a subject from a normal image output by the normal-position sensor, a macro image output by the macro-position sensor, and an infinity image output by the infinity-position sensor; a contrast information calculation unit configured to calculate contrast information indicating a contrast of the subject; a distance calculation unit configured to calculate, based on the contrast information, a subject distance indicating a distance to the subject; and a three-dimensional image generation unit configured to generate, based on the normal image, the macro image, and the infinity image, a three-dimensional image having a parallax depending on the subject distance.

(9) The imaging apparatus according to (8), further comprising a storage unit configured to store the normal image, the macro image, the infinity image, the contrast information, and the subject distance.

(10) The imaging apparatus according to (8), further comprising a display unit configured to display an image selected from the group comprising the normal image, the macro image, the infinity image, and the three-dimensional image.

(11) The imaging apparatus according to (2), further comprising: a line-of-sight detection unit configured to detect a line of sight of a user; and a three-dimensional image generation unit configured to detect, based on the light of sight of the user, a subject of interest among objects displayed on a three-dimensional display unit, and to generate a three-dimensional image in which the subject of interest is in focus.

(12) The imaging apparatus according to (11), wherein the three-dimensional image generation unit is configured to generate a three-dimensional image in which the subject of interest and another object whose distance from the subject of interest is within a predetermined threshold are in focus.

(13) The imaging apparatus according to (1), wherein the lens unit is a zoom lens unit comprising a plurality of lenses with the same optical axis.

(14) An imaging method, comprising: capturing, by an imaging apparatus, at least three images simultaneously in which focus is achieved for at least three different distances, the imaging apparatus including: a lens unit configured to focus light; at least three image sensors configured to perform photoelectric conversion; and a light-splitting unit configured to split the light from the lens unit into at least three light branches, each light branch corresponding to a different image sensor, and further configured to respectively guide the light branches to respective ones of the image sensors simultaneously.

(15) The imaging method according to (14), wherein each light branch has a different optical path length.

(16) The imaging method according to (15), wherein the at least three image sensors include: a normal-position sensor positioned such that an optical path length of a normal-position light branch is a predetermined distance corresponding to a focal position of the lens unit; a macro-position sensor positioned such that an optical path length of a macro-position light branch is less than the predetermined distance; and an infinity-position sensor positioned such that an optical path length of an infinity-position light branch is greater than the predetermined distance.

(17) The imaging method according to (16), further comprising: outputting, by the normal-position sensor, a color image; and outputting, by the macro-position sensor and the infinity-position sensor, respective black-and-white images.

(18) The imaging method according to (16), wherein the light-splitting unit is configured to split the light from the lens unit such that a light amount of the normal-position light branch is larger than respective light amounts of the macro-position light branch and the infinity-position light branch.

(19) The imaging method according to (18), wherein the light amount of the normal-position light branch is at least six times larger than respective light amounts of the macro-position light branch and the infinity-position light branch.

(20) The imaging method according to (16), wherein: the imaging apparatus further comprises: an electronic normal-position shutter corresponding to the normal-position sensor; an electronic macro-position shutter corresponding to the macro-position sensor; and an electronic infinity-position shutter corresponding to the infinity-position sensor; the method further comprising controlling, via a control unit, the normal-position, macro-position, and infinity-position shutters such that a shutter speed of the normal-position shutter is different from respective shutter speeds of the macro-position and infinity-position shutters.

(21) The imaging method according to (16), further comprising: extracting, via a subject extraction unit, a subject from a normal image output by the normal-position sensor, a macro image output by the macro-position sensor, and an infinity image output by the infinity-position sensor; calculating, via a contrast information calculation unit, contrast information indicating a contrast of the subject; calculating, via a distance calculation unit, based on the contrast information, a subject distance indicating a distance to the subject; and generating, via a three-dimensional image generation unit, based on the normal image, the macro image, and the infinity image, a three-dimensional image having a parallax depending on the subject distance.

(22) The imaging method according to (15), further comprising: detecting, via a line-of-sight detection unit, a line of sight of a user; detecting, via a three-dimensional image generation unit, based on the light of sight of the user, a subject of interest among objects displayed on a three-dimensional display unit; and generating, via the three-dimensional image generation unit, a three-dimensional image in which the subject of interest is in focus.

(23) The imaging method according to claim 22, further comprising: generating, via the three-dimensional image generation unit, a three-dimensional image in which the subject of interest and another object whose distance from the subject of interest is within a predetermined threshold are in focus.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus for generating a three-dimensional display image, comprising:
   a lens unit configured to focus light;
   at least three image sensors, each of the at least three image sensors configured to perform photoelectric conversion to generate an image output, wherein the at least three image sensors include a normal-position image sensor, a macro-position image sensor, and an infinity-position image sensor;
   a light-dispersing unit including one of a prism, one or more mirrors, or a combination thereof, the light-dispersing unit is configured to disperse the light from the lens unit into at least three light branches including a normal-position light branch corresponding to the normal-position image sensor, a macro-position light branch corresponding to the macro-position image sensor, and an infinity-position light branch corresponding to the infinity-position image sensor, and guide the at least three light branches to the at least three image sensors simultaneously;
   a subject extraction circuitry configured to
      extract a subject from a normal image output generated by the normal-position image sensor,
      extract the subject from a macro image output generated by the macro-position image sensor, and
      extract the subject from an infinity image output generated by the infinity-position image sensor;
   a contrast information calculation circuitry configured to
      determine a first contrast value of the subject that is extracted from the normal image output,
      determine a second contrast value of the subject that is extracted from the macro image output,
      determine a third contrast value of the subject that is extracted from the infinity image output, and
      calculate contrast information indicating a contrast distribution of the subject across the macro image output, the normal image output, and the infinity image output based on the first contrast value, the second contrast value, and the third contrast value;
   a distance calculation circuitry configured to calculate a subject distance from the imaging apparatus to the subject based on the contrast information;
   a parallax calculation circuitry configured to determine a subject parallax based on the subject distance and a second distance that is not associated with the subject; and
   a three-dimensional display image generation circuitry configured to generate the three-dimensional display image, the three-dimensional display image having a left image and a right image,
   wherein, to generate the three-dimensional display image, the three-dimensional display image generation circuitry is configured to
      set the normal image output, the macro image output, or the infinity image output as one of the left image or the right image of the three-dimensional display image,
      generate an image including the subject from the normal image output that is moved by an offset amount in a horizontal direction, the offset amount based on the subject parallax, and
      set the image that is generated as the other one of the left image or the right image of the three-dimensional display image,
   wherein each of the at least three light branches has a different optical path length, and
   wherein
      the normal-position image sensor is positioned such that an optical path length of the normal-position light branch is a predetermined distance corresponding to a focal position of the lens unit;
      the macro-position image sensor is positioned such that an optical path length of the macro-position light branch is less than the predetermined distance; and
      the infinity-position image sensor is positioned such that an optical path length of the infinity-position light branch is greater than the predetermined distance.

2. The imaging apparatus according to claim 1, wherein the normal-position image sensor is configured to output a color image; and
   the macro-position image sensor and the infinity-position image sensor are configured to respectively output a black-and-white image.

3. The imaging apparatus according to claim 1, wherein the light-dispersing unit is configured to disperse the light from the lens unit such that a light amount of the normal-position light branch is larger than respective light amounts of the macro-position light branch and the infinity-position light branch.

4. The imaging apparatus according to claim 3, wherein the light amount of the normal-position light branch is at least six times larger than the respective light amounts of the macro-position light branch and the infinity-position light branch.

5. The imaging apparatus according to claim 1, further comprising:

an electronic normal-position shutter corresponding to the normal-position image sensor;

an electronic macro-position shutter corresponding to the macro-position image sensor;

an electronic infinity-position shutter corresponding to the infinity-position image sensor; and a control circuitry configured to control the electronic normal-position shutter, the electronic macro-position shutter, and the electronic infinity-position shutter such that a shutter speed of the electronic normal-position shutter is different from respective shutter speeds of the electronic macro-position shutter and the electronic infinity-position shutter.

6. The imaging apparatus according to claim 1, further comprising a storage circuitry configured to store the normal image output, the macro image output, the infinity image output, the contrast information, and the subject distance.

7. The imaging apparatus according to claim 1, further comprising a display circuitry configured to display an image selected from a group consisting of:
an image of the normal image output,
an image of the macro image output,
an image of the infinity image output, and
the three-dimensional display image.

8. The imaging apparatus according to claim 1, further comprising:
a line-of-sight detection circuitry configured to
detect a line of sight of a user, and
a distance between eyes of the user,
wherein the three-dimensional display image generation circuitry is further configured to
detect a subject of interest among objects displayed on a three-dimensional display circuitry based on the line of sight of the user, and
generate the three-dimensional display image with the subject of interest in focus on the three-dimensional display circuitry, and
wherein the second distance that is not associated with the subject is the distance between the eyes of the user.

9. The imaging apparatus according to claim 8, wherein the three-dimensional display image generation circuitry is further configured to generate the three-dimensional display image with the subject of interest in focus and another object in focus on the three-dimensional display circuitry, wherein the another object has a distance from the subject of interest that is within a predetermined threshold.

10. The imaging apparatus according to claim 1, wherein the lens unit is a zoom lens unit comprising a plurality of lenses with the same optical axis.

11. A three-dimensional display image generation method, the method comprising:
focusing, with a lens unit of an imaging apparatus, light;
dispersing, with a light-dispersing unit of the imaging apparatus, the light from the lens unit into at least three light branches, wherein the light-dispersing unit includes one of a prism, one or more mirrors, or a combination thereof, and wherein the at least three light branches include a normal-position light branch, a macro-position light branch, and an infinity-position light branch;
performing, with a normal-position image sensor of the imaging apparatus, photoelectric conversion of the normal-position light branch to generate a normal image output;
performing, with a macro-position image sensor of the imaging apparatus, photoelectric conversion of the macro-position light branch to generate a macro image output;
performing, with an infinity-position image sensor of the imaging apparatus, photoelectric conversion of the infinity-position light branch to generate an infinity image output;
extracting, with a subject extraction circuitry, a subject from the normal image output;
extracting, with the subject extraction circuitry, the subject from the macro image output;
extracting, with the subject extraction circuitry, the subject from the infinity image output;
determining, with a contrast information calculation circuitry, a first contrast value of the subject that is extracted from the normal image output;
determining, with the contrast information calculation circuitry, a second contrast value of the subject that is extracted from the macro image output;
determining, with the contrast information calculation circuitry, a third contrast value of the subject that is extracted from the infinity image output;
calculating, with the contrast information calculation circuitry, contrast information indicative of a contrast distribution of the subject across the macro image output, the normal image output, and the infinity image output based on the first contrast value, the second contrast value, and the third contrast value;
calculating, with a distance calculation circuitry, a subject distance from the imaging apparatus to the subject based on the contrast information;
determining, with a parallax calculation circuitry, a subject parallax based on the subject distance and a second distance that is not associated with the subject; and
generating, with a three-dimensional display image generation circuitry, a three-dimensional display image having a left image and a right image,
wherein generating the three-dimensional display image further includes
setting the normal image output, the macro image output, or the infinity image output as one of the left image or the right image of the three-dimensional display image,
generating an image including the subject from the normal image output that is moved by an offset amount in a horizontal direction, the offset amount based on the subject parallax, and
setting the image that is generated as the other one of the left image or the right image of the three-dimensional display image,
wherein each of the at least three light branches has a different optical path length, and
wherein
the normal-position image sensor is positioned such that an optical path length of the normal-position light branch is a predetermined distance corresponding to a focal position of the lens unit;
the macro-position image sensor is positioned such that an optical path length of the macro-position light branch is less than the predetermined distance; and
the infinity-position image sensor is positioned such that an optical path length of the infinity-position light branch is greater than the predetermined distance.

12. The three-dimensional display image generation method according to claim 11, wherein performing the photoelectric conversion of the normal-position light branch to generate the normal image output further includes outputting a color image, wherein performing the photoelectric conversion of the macro-position light branch to generate the macro image output further includes outputting a first black-and-white image; and wherein performing the photoelectric conversion of the infinity-position light branch to generate the infinity image output further includes outputting a second black-and-white image.

13. The three-dimensional display image generation method according to claim 11, wherein dispersing the light from the lens unit into the at least three light branches further includes dispersing the light from the lens unit such that a light amount of the normal-position light branch is larger than respective light amounts of the macro-position light branch and the infinity-position light branch.

14. The three-dimensional display image generation method according to claim 13, wherein the light amount of the normal-position light branch is at least six times larger than respective light amounts of the macro-position light branch and the infinity-position light branch.

15. The three-dimensional display image generation method according to claim 11, further comprising:
controlling, with a control circuitry, an electronic normal-position shutter corresponding to the normal-position image sensor to have a first shutter speed;
controlling, with the control circuitry, an electronic macro-position shutter corresponding to the macro-position image sensor to have a second shutter speed; and
controlling, with the control circuitry, an electronic infinity-position shutter corresponding to the infinity-position image sensor to have a third shutter speed,
wherein the first shutter speed is different than the second shutter speed and the third shutter speed.

16. The three-dimensional display image generation method according to claim 11, further comprising:
detecting, with a line-of-sight detection circuitry, a line of sight of a user;
detecting, with the line-of-sight detection circuitry, a distance between eyes of the user; and
detecting, with the three-dimensional display image generation circuitry a subject of interest among objects displayed on a three-dimensional display circuitry based on the line of sight of the user,
wherein generating the three-dimensional display image further includes generating the three-dimensional display image with the subject of interest in focus on the three-dimensional display circuitry, and
wherein the second distance that is not associated with the subject is the distance between the eyes of the user.

17. The three-dimensional display image generation method according to claim 16,
wherein generating the three-dimensional display image further includes generating the three-dimensional display image with the subject of interest in focus and another object in focus on the three-dimensional display circuitry, wherein a distance between the another object and the subject of interest is within a predetermined threshold.

18. An imaging apparatus for generating a three-dimensional display image, the imaging apparatus comprising:
a lens unit configured to focus light;
at least three image sensors, each of the at least three image sensors configured to perform photoelectric conversion to generate an image output, wherein the at least three image sensors include a normal-position image sensor, a macro-position image sensor, and an infinity-position image sensor;
a light-dispersing unit including one of a prism, one or more mirrors, or a combination thereof, the light-dispersing unit is configured to disperse the light from the lens unit into at least three light branches including a normal-position light branch corresponding to the normal-position image sensor, a macro-position light branch corresponding to the macro-position image sensor, and an infinity-position light branch corresponding to the infinity-position image sensor, and guide the at least three light branches to the at least three image sensors simultaneously; and
an electronic processor configured to
extract a subject from a normal image output generated by the normal-position image sensor,
extract the subject from a macro image output generated by the macro-position image sensor, and
extract the subject from an infinity image output generated by the infinity-position image sensor,
determine a first contrast value of the subject that is extracted from the normal image output,
determine a second contrast value of the subject that is extracted from the macro image output,
determine a third contrast value of the subject that is extracted from the infinity image output, and
calculate contrast information indicating a contrast distribution of the subject across the macro image output, the normal image output, and the infinity image output based on the first contrast value, the second contrast value, and the third contrast value,
calculate a subject distance from the imaging apparatus to the subject based on the contrast information,
determine a subject parallax based on the subject distance and a second distance that is not associated with the subject, and
generate the three-dimensional display image, the three-dimensional display image having a left image and a right image,
wherein, to generate the three-dimensional display image, the electronic processor is configured to
set the normal image output, the macro image output, or the infinity image output as one of the left image or the right image of the three-dimensional display image,
generate an image including the subject from the normal image output that is moved by an offset amount in a horizontal direction, the offset amount based on the subject parallax, and
set the image that is generated as the other one of the left image or the right image of the three-dimensional display image,
wherein each of the at least three light branches has a different optical path length, and
wherein
the normal-position image sensor is positioned such that an optical path length of the normal-position light branch is a predetermined distance corresponding to a focal position of the lens unit;
the macro-position image sensor is positioned such that an optical path length of the macro-position light branch is less than the predetermined distance; and the infinity-position image sensor is positioned such that an optical path length of the infinity-position light branch is greater than the predetermined distance.

19. The imaging apparatus according to claim 18, wherein the electronic processor is further configured to detect a line of sight of a user, detect a distance between eyes of the user, detect a subject of interest among objects displayed on a three-dimensional display circuitry based on the line of sight of the user, and generate the three-dimensional display image with the subject of interest in focus on the three-dimensional display circuitry, wherein the second distance that is not associated with the subject is the distance between the eyes of the user.

20. The three-dimensional display image generation method according to claim 16, wherein the subject of interest is one selected from a group consisting of:

a normal image subject of the normal image output, a macro image subject of the macro image output, and an infinity image subject of the infinity image output.

21. The imaging apparatus according to claim 8, wherein the subject of interest is one selected from a group consisting of:

a normal image subject of the normal image output, a macro image subject of the macro image output, and an infinity image subject of the infinity image output.

22. The imaging apparatus according to claim 6, wherein the storage circuitry is further configured to store the predetermined distance, and wherein the second distance that is not associated with the subject is the predetermined distance stored in the storage circuitry.

23. The imaging apparatus according to claim 1, wherein the offset amount is proportional to the subject parallax.

* * * * *